United States Patent
Jansen et al.

(10) Patent No.: US 11,091,815 B2
(45) Date of Patent: Aug. 17, 2021

(54) INTEGRATED METHODS FOR TREATING LIGNOCELLULOSIC MATERIAL

(71) Applicant: VIRDIA, LLC, Danville, VA (US)

(72) Inventors: Robert Jansen, Collinsville, IL (US); James Alan Lawson, Ellsworth, ME (US); Noa Lapidot, Mevaseret Zion (IL); Neta Matis, Hod Hasharon (IL); Bassem Hallac, Jersusalem (IL)

(73) Assignee: Virdia, LLC, Danville, VA (US)

(*) Notice: Subject to any disclaimer, the term of this patent is extended or adjusted under 35 U.S.C. 154(b) by 0 days.

(21) Appl. No.: 15/573,801

(22) PCT Filed: May 25, 2016

(86) PCT No.: PCT/US2016/034194
§ 371 (c)(1),
(2) Date: Nov. 13, 2017

(87) PCT Pub. No.: WO2016/191503
PCT Pub. Date: Dec. 1, 2016

(65) Prior Publication Data
US 2018/0148804 A1     May 31, 2018

Related U.S. Application Data

(60) Provisional application No. 62/167,111, filed on May 27, 2015.

(51) Int. Cl.
*C13K 13/00*     (2006.01)
*C13K 1/02*      (2006.01)
(Continued)

(52) U.S. Cl.
CPC .............. *C13K 13/002* (2013.01); *C07G 1/00* (2013.01); *C08H 8/00* (2013.01); *C13K 1/02* (2013.01);
(Continued)

(58) Field of Classification Search
None
See application file for complete search history.

(56) References Cited

U.S. PATENT DOCUMENTS 2,008,284 A    7/1935   Koch et al.
2,380,448 A    7/1945   Katzen
(Continued)

FOREIGN PATENT DOCUMENTS

CN    1082115 A    2/1994
CN    1353310 A    6/2002
(Continued)

OTHER PUBLICATIONS

Hirajima et al, semibatch hydrothermal hydrolysis of cellulose in a filter paper by dilute organic acids, industrial and engineering chemistry reasearch, ACS publications, published May 22, 2015 (Year: 2015).*

(Continued)

*Primary Examiner* — Stefanie J Cohen
(74) *Attorney, Agent, or Firm* — Polsinelli PC

(57) ABSTRACT

The present disclosure relates to methods of processing lignocellulosic material to obtain cellulose and cellulose sugars. Also provided are compositions of cellulose hydrolysates.

15 Claims, 5 Drawing Sheets

(51) Int. Cl.
*D21C 3/20* (2006.01)
*C08H 8/00* (2010.01)
*C07G 1/00* (2011.01)
*C13K 11/00* (2006.01)

(52) U.S. Cl.
CPC .............. *C13K 11/00* (2013.01); *C13K 13/00* (2013.01); *D21C 3/20* (2013.01)

(56) References Cited

U.S. PATENT DOCUMENTS

| | | | |
|---|---|---|---|
| 2,752,270 A | 6/1956 | Specht | |
| 2,917,390 A | 12/1959 | Apel et al. | |
| 2,989,569 A | 6/1961 | Apel | |
| 3,132,051 A | 5/1964 | Nobile et al. | |
| 3,212,933 A | 10/1965 | Hess et al. | |
| 3,616,222 A | 10/1971 | Dasinger | |
| 3,990,904 A | 11/1976 | Friese et al. | |
| 4,029,515 A | 6/1977 | Kiminki et al. | |
| 4,102,705 A | 7/1978 | Pfeiffer et al. | |
| 4,105,467 A | 8/1978 | Buckl et al. | |
| 4,174,976 A | 11/1979 | Bose et al. | |
| 4,237,110 A | 12/1980 | Forster et al. | |
| 4,266,981 A | 5/1981 | Tsao et al. | |
| 4,277,626 A | 7/1981 | Forss et al. | |
| 4,299,677 A | 11/1981 | Venkatasubramanian et al. | |
| 4,328,004 A | 5/1982 | Globus | |
| 4,374,738 A | 2/1983 | Kelley | |
| 4,382,843 A | 5/1983 | Black | |
| 4,395,543 A | 7/1983 | Wang et al. | |
| 4,445,938 A | 5/1984 | Verwaerde et al. | |
| 4,470,851 A | 9/1984 | Paszner et al. | |
| 4,472,501 A | 9/1984 | Takasawa et al. | |
| 4,496,426 A | 1/1985 | Baumeister et al. | |
| 4,516,566 A | 5/1985 | Chao et al. | |
| 4,520,105 A | 5/1985 | Sinner et al. | |
| 4,525,218 A | 6/1985 | Chen et al. | |
| 4,556,430 A | 12/1985 | Converse et al. | |
| 4,579,595 A | 4/1986 | Sachetto et al. | |
| 4,608,245 A | 8/1986 | Gaddy et al. | |
| 4,612,286 A | 9/1986 | Sherman et al. | |
| 4,615,742 A | 10/1986 | Wright | |
| 4,631,129 A | 12/1986 | Heikkila | |
| 4,677,198 A | 6/1987 | Linnett et al. | |
| 4,701,414 A | 10/1987 | Van Dijken et al. | |
| 4,746,401 A | 5/1988 | Roberts et al. | |
| 4,764,596 A | 8/1988 | Lora et al. | |
| 4,840,903 A | 6/1989 | Wu | |
| 4,966,650 A | 10/1990 | Delong et al. | |
| 4,992,308 A | 2/1991 | Sunol | |
| 5,028,336 A * | 7/1991 | Bartels ................ | B01D 61/027 210/639 |
| 5,049,494 A | 9/1991 | Allenza | |
| 5,081,026 A | 1/1992 | Heikkilae et al. | |
| 5,114,491 A | 5/1992 | Sarhaddar | |
| 5,227,446 A | 7/1993 | Denzinger et al. | |
| 5,244,553 A | 9/1993 | Goldstein | |
| 5,370,997 A | 12/1994 | Antranikian et al. | |
| 5,407,580 A | 4/1995 | Hester et al. | |
| 5,424,417 A | 6/1995 | Torget et al. | |
| 5,480,490 A | 1/1996 | Toth et al. | |
| 5,538,637 A | 7/1996 | Hester et al. | |
| 5,580,389 A | 12/1996 | Farone et al. | |
| 5,597,714 A | 1/1997 | Farone et al. | |
| 5,711,817 A | 1/1998 | Titmas | |
| 5,726,046 A | 3/1998 | Farone et al. | |
| 5,730,837 A | 3/1998 | Black et al. | |
| 5,782,982 A | 7/1998 | Farone et al. | |
| 5,820,687 A | 10/1998 | Farone et al. | |
| 5,846,787 A | 12/1998 | Ladisch et al. | |
| 5,865,948 A | 2/1999 | Lora et al. | |
| 5,876,505 A | 3/1999 | Klyosov et al. | |
| 5,980,640 A | 11/1999 | Nurmi et al. | |
| 6,001,410 A | 12/1999 | Bolen et al. | |
| 6,007,636 A | 12/1999 | Lightner | |
| 6,022,419 A | 2/2000 | Torget et al. | |
| 6,063,204 A | 5/2000 | Hester et al. | |
| 6,086,681 A * | 7/2000 | Lindroos ................ | C13K 5/00 127/37 |
| 6,093,217 A | 7/2000 | Froelich et al. | |
| 6,224,776 B1 | 5/2001 | Heikkilä et al. | |
| 6,230,477 B1 | 5/2001 | Caillouet | |
| 6,258,175 B1 | 7/2001 | Lightner | |
| 6,391,204 B1 | 5/2002 | Russo, Jr. | |
| 6,409,841 B1 | 6/2002 | Lombard | |
| 6,419,828 B1 | 7/2002 | Russo, Jr. | |
| 6,431,370 B1 | 8/2002 | Braunstein et al. | |
| 6,451,123 B1 | 9/2002 | Saska et al. | |
| 6,548,662 B1 | 4/2003 | Ohsaki et al. | |
| 6,620,292 B2 | 9/2003 | Wingerson | |
| 6,692,578 B2 | 2/2004 | Schmidt et al. | |
| 6,852,345 B2 | 2/2005 | Hill et al. | |
| 6,872,316 B2 | 3/2005 | Heikkila et al. | |
| 6,924,371 B2 | 8/2005 | Karki et al. | |
| 6,942,754 B2 | 9/2005 | Izumi et al. | |
| 7,026,152 B2 | 4/2006 | Ingram et al. | |
| 7,109,005 B2 | 9/2006 | Eroma et al. | |
| 7,198,925 B2 | 4/2007 | Foody | |
| 7,465,791 B1 | 12/2008 | Hallberg et al. | |
| 7,501,025 B2 | 3/2009 | Bakker et al. | |
| 7,503,981 B2 | 3/2009 | Wyman et al. | |
| 7,557,262 B2 * | 7/2009 | Lanahan ......... | C12Y 302/01003 800/284 |
| 7,649,086 B2 | 1/2010 | Belanger et al. | |
| 7,699,958 B2 | 4/2010 | Griffith et al. | |
| 7,718,070 B2 | 5/2010 | Wahnon et al. | |
| 7,771,964 B2 | 8/2010 | Kim et al. | |
| 7,834,092 B2 | 11/2010 | Uradnisheck et al. | |
| 7,883,882 B2 | 2/2011 | Franklin et al. | |
| 8,030,039 B1 | 10/2011 | Retsina et al. | |
| 8,052,953 B2 | 11/2011 | Chen | |
| 8,101,808 B2 | 1/2012 | Evanko et al. | |
| 8,382,905 B2 | 2/2013 | Takeshima et al. | |
| 8,404,355 B2 | 3/2013 | Jansen et al. | |
| 8,497,091 B2 * | 7/2013 | Hanakawa ................ | C12P 7/06 435/41 |
| 8,500,910 B2 | 8/2013 | Brady et al. | |
| 8,657,960 B2 | 2/2014 | North | |
| 8,685,685 B2 | 4/2014 | Retsina et al. | |
| 8,722,878 B2 * | 5/2014 | Raines .................... | C08B 1/003 536/124 |
| 8,926,794 B2 * | 1/2015 | Han ........................ | D21C 3/04 162/14 |
| 8,932,467 B2 | 1/2015 | Fosbol et al. | |
| 9,115,467 B2 | 8/2015 | Jansen et al. | |
| 9,243,303 B2 | 1/2016 | Fang | |
| 9,410,216 B2 | 8/2016 | Eyal et al. | |
| 9,476,106 B2 | 10/2016 | Eyal et al. | |
| 9,512,495 B2 | 12/2016 | Eyal | |
| 9,617,608 B2 | 4/2017 | Eyal et al. | |
| 9,650,687 B2 | 5/2017 | Jansen et al. | |
| 9,663,836 B2 | 5/2017 | Jansen et al. | |
| 9,765,478 B2 * | 9/2017 | Brandt ..................... | D21C 3/06 |
| 9,845,514 B2 | 12/2017 | Eyal et al. | |
| 9,963,673 B2 | 5/2018 | Eyal et al. | |
| 9,976,194 B2 | 5/2018 | Eyal et al. | |
| 10,041,138 B1 | 8/2018 | Eyal et al. | |
| 10,240,217 B2 | 3/2019 | Jansen et al. | |
| 10,752,878 B2 | 8/2020 | Eyal et al. | |
| 10,760,138 B2 | 9/2020 | Eyal et al. | |
| 2001/0003797 A1 | 6/2001 | Guevara et al. | |
| 2002/0061950 A1 | 5/2002 | Yamamoto et al. | |
| 2002/0069981 A1 | 6/2002 | Speaks et al. | |
| 2002/0096274 A1 | 7/2002 | Lindstrom et al. | |
| 2002/0153317 A1 | 10/2002 | Heikkila et al. | |
| 2002/0159990 A1 | 10/2002 | Ingram et al. | |
| 2002/0164731 A1 | 11/2002 | Eroma et al. | |
| 2003/0094416 A1 | 5/2003 | Heikkila et al. | |
| 2003/0121516 A1 | 7/2003 | Hyoeky et al. | |
| 2003/0192660 A1 | 10/2003 | Speaks et al. | |
| 2003/0199049 A1 | 10/2003 | Nguyen et al. | |
| 2003/0222021 A1 | 12/2003 | Ennelin et al. | |
| 2004/0074217 A1 | 4/2004 | Reaux | |
| 2004/0108085 A1 | 6/2004 | Kettenbach et al. | |

(56) References Cited

U.S. PATENT DOCUMENTS

| | | |
|---|---|---|
| 2004/0127371 A1 | 7/2004 | Arrowsmith et al. |
| 2004/0231661 A1 | 11/2004 | Griffin et al. |
| 2005/0034823 A1 | 2/2005 | Brelid et al. |
| 2005/0069998 A1 | 3/2005 | Ballesteros Perdices et al. |
| 2005/0136520 A1 | 6/2005 | Kinley et al. |
| 2005/0148056 A1 | 7/2005 | Levine et al. |
| 2005/0244934 A1 | 11/2005 | Foody et al. |
| 2006/0041059 A1* | 2/2006 | Fukasawa ............. C09J 161/04 525/56 |
| 2006/0051812 A1 | 3/2006 | Helin et al. |
| 2006/0207734 A1 | 9/2006 | Day et al. |
| 2007/0053987 A1 | 3/2007 | Bayer et al. |
| 2007/0112187 A1 | 5/2007 | Heikkila et al. |
| 2007/0184555 A1 | 8/2007 | Banavali et al. |
| 2007/0197363 A1 | 8/2007 | Parrotta et al. |
| 2007/0254348 A1 | 11/2007 | Retsina et al. |
| 2008/0041366 A1 | 2/2008 | Wahnon et al. |
| 2008/0057555 A1 | 3/2008 | Nguyen |
| 2008/0102502 A1 | 5/2008 | Foody et al. |
| 2008/0168982 A1 | 7/2008 | Vente et al. |
| 2008/0182305 A1 | 7/2008 | Foody et al. |
| 2008/0193992 A1 | 8/2008 | Levine |
| 2008/0202504 A1 | 8/2008 | Hilst |
| 2008/0210393 A1 | 9/2008 | Gutierrez-Suarez et al. |
| 2008/0227161 A1 | 9/2008 | Levie et al. |
| 2008/0274509 A1 | 11/2008 | Filho et al. |
| 2008/0274528 A1 | 11/2008 | Dixon et al. |
| 2008/0292766 A1 | 11/2008 | Hoffman et al. |
| 2008/0299606 A1 | 12/2008 | Pompejus et al. |
| 2008/0305210 A1 | 12/2008 | Petersen |
| 2009/0056707 A1 | 3/2009 | Foody et al. |
| 2009/0061486 A1 | 3/2009 | Edwards et al. |
| 2009/0061495 A1 | 3/2009 | Beatty et al. |
| 2009/0062232 A1 | 3/2009 | Fujikawa et al. |
| 2009/0124829 A1 | 5/2009 | Gong |
| 2009/0142848 A1 | 6/2009 | Wyman et al. |
| 2009/0155873 A1 | 6/2009 | Kashiyama et al. |
| 2009/0173339 A1 | 7/2009 | Heikkilae et al. |
| 2009/0176286 A1 | 7/2009 | O'Connor et al. |
| 2009/0176979 A1 | 7/2009 | Hara et al. |
| 2009/0218055 A1 | 9/2009 | Uusitalo et al. |
| 2009/0226979 A1 | 9/2009 | Retsina et al. |
| 2009/0226993 A1 | 9/2009 | Kumar et al. |
| 2009/0229599 A1 | 9/2009 | Zhang et al. |
| 2009/0232892 A1 | 9/2009 | Yamasaki et al. |
| 2009/0305942 A1 | 12/2009 | Day et al. |
| 2010/0024807 A1 | 2/2010 | Burke et al. |
| 2010/0043782 A1 | 2/2010 | Kilambi et al. |
| 2010/0043784 A1 | 2/2010 | Jensen |
| 2010/0048884 A1 | 2/2010 | Kilambi |
| 2010/0048924 A1 | 2/2010 | Kilambi |
| 2010/0055753 A1 | 3/2010 | Geros |
| 2010/0069626 A1 | 3/2010 | Kilambi |
| 2010/0083565 A1 | 4/2010 | Gruter et al. |
| 2010/0086981 A1 | 4/2010 | Latouf et al. |
| 2010/0093995 A1 | 4/2010 | Baniel et al. |
| 2010/0124772 A1 | 5/2010 | Sabesan |
| 2010/0136634 A1 | 6/2010 | Kratochvil et al. |
| 2010/0136642 A1 | 6/2010 | Belanger et al. |
| 2010/0146844 A1 | 6/2010 | Dumenil |
| 2010/0151535 A1 | 6/2010 | Franklin et al. |
| 2010/0159566 A1 | 6/2010 | Leschine et al. |
| 2010/0160624 A1 | 6/2010 | Cunningham |
| 2010/0163019 A1 | 7/2010 | Chornet et al. |
| 2010/0167351 A1 | 7/2010 | Eyal et al. |
| 2010/0170504 A1 | 7/2010 | Zhang |
| 2010/0184151 A1 | 7/2010 | Tolan et al. |
| 2010/0184176 A1 | 7/2010 | Ishida et al. |
| 2010/0189706 A1 | 7/2010 | Chang et al. |
| 2010/0196979 A1 | 8/2010 | Birkmire et al. |
| 2010/0203605 A1 | 8/2010 | Kim et al. |
| 2010/0213130 A1 | 8/2010 | Airaksinen et al. |
| 2010/0249390 A1 | 9/2010 | Azuma et al. |
| 2010/0255554 A1 | 10/2010 | Benson et al. |
| 2010/0268000 A1 | 10/2010 | Parekh et al. |
| 2010/0269990 A1 | 10/2010 | Dottori et al. |
| 2010/0279361 A1 | 11/2010 | South et al. |
| 2010/0279372 A1 | 11/2010 | Cho et al. |
| 2010/0287826 A1 | 11/2010 | Hoffman et al. |
| 2010/0297704 A1 | 11/2010 | Li |
| 2010/0313882 A1 | 12/2010 | Dottori et al. |
| 2011/0003352 A1 | 1/2011 | Retsina et al. |
| 2011/0020873 A1 | 1/2011 | Ren et al. |
| 2011/0020910 A1 | 1/2011 | Glass et al. |
| 2011/0028710 A1 | 2/2011 | Baniel et al. |
| 2011/0033640 A1 | 2/2011 | Yamada et al. |
| 2011/0053238 A1 | 3/2011 | Ohgren Gredegard et al. |
| 2011/0061645 A1 | 3/2011 | Fosdick et al. |
| 2011/0065159 A1 | 3/2011 | Raines et al. |
| 2011/0097776 A1 | 4/2011 | Johnson |
| 2011/0126448 A1 | 6/2011 | Dumenil |
| 2011/0129880 A1 | 6/2011 | Conners et al. |
| 2011/0143411 A1 | 6/2011 | Yuan et al. |
| 2011/0146138 A1 | 6/2011 | Berry et al. |
| 2011/0155559 A1 | 6/2011 | Medoff |
| 2011/0183394 A1 | 7/2011 | Bell et al. |
| 2011/0192560 A1 | 8/2011 | Heikkila et al. |
| 2011/0201059 A1 | 8/2011 | Hall et al. |
| 2011/0256615 A1 | 10/2011 | Brady et al. |
| 2011/0263811 A1 | 10/2011 | Sawai et al. |
| 2011/0314726 A1 | 12/2011 | Jameel et al. |
| 2011/0318796 A1 | 12/2011 | Walther |
| 2012/0036768 A1 | 2/2012 | Phillips et al. |
| 2012/0040408 A1 | 2/2012 | Decker et al. |
| 2012/0058526 A1 | 3/2012 | Jansen et al. |
| 2012/0116063 A1 | 5/2012 | Jansen et al. |
| 2012/0122170 A1 | 5/2012 | Ropars et al. |
| 2012/0135489 A1 | 5/2012 | Weydahl |
| 2012/0184026 A1 | 7/2012 | Eyal |
| 2012/0240921 A1 | 9/2012 | Fukuoka et al. |
| 2012/0264873 A1 | 10/2012 | Eyal et al. |
| 2012/0282655 A1 | 11/2012 | Gibbs |
| 2012/0308991 A1 | 12/2012 | Eiteman et al. |
| 2013/0019859 A1* | 1/2013 | Qiao ....................... C10G 1/06 127/36 |
| 2013/0210101 A1* | 8/2013 | Parekh ...................... C12P 7/10 435/165 |
| 2013/0217070 A1 | 8/2013 | Zhao et al. |
| 2013/0252312 A1 | 9/2013 | Yoshikuni et al. |
| 2013/0276778 A1 | 10/2013 | Jansen et al. |
| 2013/0295628 A1 | 11/2013 | Retsina et al. |
| 2014/0123973 A1 | 5/2014 | North |
| 2014/0154759 A1 | 6/2014 | Retsina et al. |
| 2014/0175331 A1 | 6/2014 | Jansen et al. |
| 2014/0200365 A1* | 7/2014 | De Haan ................. C07C 51/02 562/593 |
| 2014/0356915 A1 | 12/2014 | Retsina et al. |
| 2015/0020797 A1 | 1/2015 | Eyal et al. |
| 2015/0028255 A1 | 1/2015 | Eyal et al. |
| 2015/0048274 A1 | 2/2015 | Eyal et al. |
| 2015/0087031 A1 | 3/2015 | Jansen et al. |
| 2015/0144126 A1 | 5/2015 | Jansen et al. |
| 2015/0176090 A1 | 6/2015 | Dumesic et al. |
| 2016/0108481 A1 | 4/2016 | Eyal et al. |
| 2016/0108482 A1 | 4/2016 | Eyal et al. |
| 2016/0376546 A1 | 12/2016 | Eyal et al. |
| 2017/0037486 A1 | 2/2017 | Eyal et al. |
| 2017/0130282 A1 | 5/2017 | Eyal et al. |
| 2017/0369957 A1 | 12/2017 | Jansen et al. |
| 2018/0142314 A1 | 5/2018 | Eyal et al. |

FOREIGN PATENT DOCUMENTS

| | | |
|---|---|---|
| CN | 1505682 A | 6/2004 |
| CN | 101001952 A | 7/2007 |
| CN | 101120102 A | 2/2008 |
| CN | 101313073 A | 11/2008 |
| CN | 101550431 A | 10/2009 |
| CN | 101613970 A | 12/2009 |
| CN | 101787398 A | 7/2010 |
| CN | 102239184 A | 11/2011 |
| CN | 102433358 B | 10/2013 |
| CN | 103717622 A | 4/2014 |
| DE | 1955392 A1 | 6/1971 |

(56) References Cited

FOREIGN PATENT DOCUMENTS

| | | |
|---|---|---|
| EP | 0018621 A1 | 11/1980 |
| EP | 0317036 A1 | 5/1989 |
| EP | 0700957 A1 | 3/1996 |
| EP | 0814676 A1 | 1/1998 |
| EP | 0690931 B1 | 10/2001 |
| EP | 0697904 B1 | 6/2002 |
| EP | 1304412 A2 | 4/2003 |
| EP | 1733282 B1 | 1/2012 |
| EP | 2325246 B1 | 11/2013 |
| GB | 1562682 A | 3/1980 |
| GB | 2488918 B | 3/2014 |
| JP | 55141451 A | 4/1976 |
| JP | 2835894 B2 | 12/1998 |
| JP | H11500912 A | 1/1999 |
| JP | 2001226409 A | 8/2001 |
| JP | 2002177000 A | 6/2002 |
| JP | 2005023041 A | 1/2005 |
| JP | 2006101829 A | 4/2006 |
| JP | 2006223152 A | 8/2006 |
| JP | 2008035853 A | 2/2008 |
| JP | 2011103874 A | 6/2011 |
| JP | 2011223975 A | 11/2011 |
| KR | 20140108301 A | 9/2014 |
| RU | 2313572 C2 | 12/2007 |
| WO | WO-8201723 A1 | 5/1982 |
| WO | WO-9417213 A1 | 8/1994 |
| WO | WO-9426380 A1 | 11/1994 |
| WO | WO-0061276 A1 | 10/2000 |
| WO | WO-0132715 A1 | 5/2001 |
| WO | WO-0202826 A1 | 1/2002 |
| WO | WO-03010339 A1 | 2/2003 |
| WO | WO-03056038 A1 | 7/2003 |
| WO | WO-2004013409 A1 | 2/2004 |
| WO | WO-2004050983 A1 | 6/2004 |
| WO | WO-2006086861 A2 | 8/2006 |
| WO | WO-2007019505 A2 | 2/2007 |
| WO | WO-2007102638 A1 | 9/2007 |
| WO | WO-2008019468 A1 | 2/2008 |
| WO | WO-2008131229 A1 | 10/2008 |
| WO | WO-2008144903 A1 | 12/2008 |
| WO | WO-2009015663 A2 | 2/2009 |
| WO | WO-2009060126 A1 | 5/2009 |
| WO | WO-2009110374 A1 | 9/2009 |
| WO | WO-2009125400 A2 | 10/2009 |
| WO | WO-2009137839 A1 | 11/2009 |
| WO | WO-2009154447 A1 | 12/2009 |
| WO | WO-2009155982 A1 | 12/2009 |
| WO | WO-2010009343 A2 | 1/2010 |
| WO | WO-2010009515 A1 | 1/2010 |
| WO | WO-2010015404 A1 | 2/2010 |
| WO | WO-2010018105 A1 | 2/2010 |
| WO | WO-2010037178 A1 | 4/2010 |
| WO | WO-2010038021 A2 | 4/2010 |
| WO | WO-2010043424 A1 | 4/2010 |
| WO | WO-2010045576 A2 | 4/2010 |
| WO | WO-2010046532 A1 | 4/2010 |
| WO | WO-2010046619 A1 | 4/2010 |
| WO | WO-2010081231 A1 | 7/2010 |
| WO | WO-2010113129 A2 | 10/2010 |
| WO | WO-2010113130 A2 | 10/2010 |
| WO | WO-2010128272 A1 | 11/2010 |
| WO | WO-2010146331 A2 | 12/2010 |
| WO | WO-2011002660 A1 | 1/2011 |
| WO | WO-2011070602 A1 | 6/2011 |
| WO | WO-2011080131 A2 | 7/2011 |
| WO | WO-2011089589 A1 | 7/2011 |
| WO | WO-2011091044 A1 | 7/2011 |
| WO | WO-2011095977 A1 | 8/2011 |
| WO | WO-2011111189 A1 | 9/2011 |
| WO | WO-2011111190 A1 | 9/2011 |
| WO | WO-2011154604 A1 | 12/2011 |
| WO | WO-2011161685 A2 | 12/2011 |
| WO | WO-2012001688 A2 | 1/2012 |
| WO | WO-2012018740 A1 | 2/2012 |
| WO | WO-2012031270 A1 | 3/2012 |
| WO | WO-2012079021 A2 | 6/2012 |
| WO | WO-2012085684 A2 | 6/2012 |
| WO | WO-2012137201 A1 | 10/2012 |
| WO | WO-2013055785 A1 | 4/2013 |
| WO | WO-2013070969 A2 | 5/2013 |
| WO | WO-2013083876 A2 | 6/2013 |
| WO | WO-2013166469 A2 | 11/2013 |
| WO | WO-2014081605 A1 | 5/2014 |
| WO | WO-2014126471 A1 | 8/2014 |
| WO | WO-2014178911 A1 | 11/2014 |
| WO | WO-2015139141 A1 | 9/2015 |
| WO | WO-2016112134 A1 | 7/2016 |
| WO | WO-2016191503 A1 | 12/2016 |

OTHER PUBLICATIONS

PCT/US2016/034194 International Search Report dated Aug. 29, 2016.
Co-pending U.S. Appl. No. 16/243,888, filed Jan. 9, 2019.
EP16800678.1 Extended European Search Report dated Feb. 5, 2019.
Aden, et al. Lignocellulosic Biomass to Ethanol Process Design and Economics Utilizing Co-Current Dilute Acid Prehydrolysis and Enzymatic Hydrolysis for Corn Stover. National Renewable Energy Laboratory, NREL is a U.S. Department of Energy Laboratory Operated by Midwest Research Institute. Jun. 2002.
Agblevor, et al. Analysis of biomass sugars using a novel HPLC method. Appl Biochem Biotechnol. Mar. 2007;136(3):309-26.
Amidon, et al. Biorefinery: Conversion of Woody Biomass to Chemicals, Energy and Materials. Journal of Biobased Materials and Bioenergy. 2008; 2:100-120.
Antonoplis, et al. High pressure HCl conversion of cellulose to glucose. Lawrence Berkeley National Laboratory, University of California, Paper LBL,14221. Aug. 1981.
Badger. Ethanol from cellulose: a general review. Trends in new crops and new uses. 2002; 17-21.
Bergius. Conversion of wood to carbohydrates and problems in the industrial use of concentrated hydrochloric acid. Industrial and Engineering chemistry. 1937; 29(3):247-253.
Bergius. The utilisation of wood for the production of foodstuffs, alcohol and glucose. Chemical society institution. Nov. 15, 1933.
Bergius. Winslow Notes on Bergius Process. 1937.
Bergius. Wood Sugar Plants at Mannheim-Rheinau & Regensburg. 1945.
Biology Online. "Oligosaccharide". Downloaded Mar. 27, 2017. 1 page.
Bozell. The Use of Renewable Feedstocks for the Production of Chemicals and Materials—A Brief Overview of Concepts. National Renewable Energy Laboratory, 1617 Cole Boulevard, Golden, CO 80401. 2010.
Bunker. The Wartime Production of Food Yeast in Germany. 2010.
Buranov, et al. Extraction and characterization of hemicelluloses from flax shives by different methods. Carbohydrate Polymers, vol. 79, No. 1, 2010 (pp. 17-25).
Campbell,et al. The Saccharification of Wood by the Bergius process at Suddeutschen Holzversuchung Werke A.G. Regensburg. Report on visit to Suddeutschen Holzversuchung Werke A.G. Regensburg.CIOS trip No. 764, this target was visited on Aug. 9, 1945.
Carvalho, et al. Comparison of different procedures for the detoxification of eucalyptus hemicellulosic hydrolysate for use in fermentative processes. J Chem Technol Biotechnol 2006; 81:152-157.
Chandel, et al. Detoxification of Lignocellulosic Hydrolysates for Improved Bioethanol Production. Biofuel Production—Recent Developments and Prospects. Sep. 1, 2011, pp. 225-246.
Chaow-U-Thai et al. Removal of ash from sugarcane leaves and tops. International Journal of Biosciences.2012; 2(5): 12-17.
dictionary.com. "Oligosaccharide". Downloaded Mar. 27, 2017. 2 pages.
Encyclopaedia Britannica. Biochemistry. "Oligosaccharide". Downloaded Mar. 27, 2017. 1 page.
Eyal, et al. Recovery and concentration of strong mineral acids from dilute solutions through LLX.I: review of parameters for adjusting

(56) References Cited

OTHER PUBLICATIONS extractant propert and analysis of process options. Solvent Extraction and ion exchange. 1991; 9(2):195-210.
Eyal, et al. Sulfuric acid recovery through solvent aided decomposition of ammonium sulfate. Solvent Extraction and ion exchange. 1986; 44:803-821.
Fahim, et al. Liquid-Liquid Equilibria of the Ternary System Water + Acetic Acid + 1-Hexanol. J. Chem. Eng. Data. 1997; 42:183-186.
Ferrari, et al., Ethanol production from eucalyptus wood hemicellulose hydrolysate by pichia stipitis, 1992, biotech and bioengineering, 40:753-759.
Finney, Nathaniel. Essentials of Glycobiology. Carbohydrate Structure and Nomenclature. Lecture. Apr. 1, 2004. pp. 1-26.
Gamez et al. Study of the hydrolysis of sugar cane bagasse using phosphoric acid. Journal of Food Engineering.2006; 74: 78-88.
Georgieva, et al. Enzymatic hydrolysis and ethanol fermentation of high dry matter wet-exploded wheat straw at low enzyme loading. Applied biochemistry and biotechnology. 2008;148:35-44.
Grande, et al. Fractionation of lignocellulosic biomass using the OrganoCat process. Green Chem. 2015; 17:3533-3539.
Górecka, et al. The application of ICP-MS and ICP-OES in determination of micronutrients in wood ashes used as soil conditioners. Talanta. Dec. 15, 2006;70(5):950-6.
Gullon, et al. Production of oligosaccharides and sugars from rye straw: a kinetic approach. Bioresource technology, 2010, 101(17), pp. 6676-6684.
Hagglund. The Decomposition of Wood by Acids wood Saccharification. Chemistry of Wood. New York: Academic Press, 1951. 631. Chapter IV. 390-413.
Hagglund. Wood Saccharification. A Modified Rheinau Process. 2011.
Hamelinck, et al. Production of advanced biofuels. International Sugar Journal. 2006; 108(1287):168-175.
Hanchar, et al. Separation of glucose and pentose sugars by selective enzyme hydrolysis of AFEX-treated corn fiber. Appl Biochem Biotechnol. Apr. 2007;137-140(1-12):313-25. doi: 10.1007/s12010-007-9061-3.
Harris. Derived products and chemical utilization of wood waste. Forest Products Laboratory; Forest Service US Department of Agriculture; Rept. No. R1666-10. Jun. 1949.
Harris, et al. Hydrolysis of wood cellulose with hydrochloric acid and sulfur dioxide and the decomposition of its hydrolytic products. Journal of Physical and Colloid Chemistry. (1949), 53:344-51. Abstract only.
Harris, et al. The Madison Wood-Sugar Process. US Dept. of Agriculture. Jun. 1946; 1-21.
Hasegawa, et al. New Pretreatment Methods Combining a Hot Water Treatment and Water/Acetone Extraction for Thermo-Chemical Conversion of Biomass. Energy & Fuels. 2004; 18:755-760.
Heinonen, et al. Chromatographic recovery of monosaccharides for the production of bioethanol from wood. Ind. Eng. Chem. Res. 2010; 49:2907-2915.
Hu, et al. The direct conversion of xylan to lactic acid by lactobacillus brevis transformed with a xylanase gene. Green Chem., vol. 13(7), pp. 1729-1734 (2011).
Ioannidou et al. Direct determination of toxic trace metals in honey and sugars using inductively coupled plasma atomic emission spectrometry. Talanta, 65(1): 92-97 (2005).
Jacobsen et al. Xylose Monomer and Oligomer Yields for Uncatalyzed Hydrolysis of Sugarcane Bagasse Hemicellulose at Varying Solids Concentration. Industrial & Engineering Chemistry Research; 2002; 41; 1454-1461.
Johnson. Effects of Dilute Acid Hydrolyzate Components on Glucose Degradation. National Bioenergy Center, NREL, 1617 Cole Blvd., Golden, Colorado 80401, USA. 2011.
Kadam, et al. Generating Process and Economic Data Needed for Preliminary Design of PureVision Biorefineries. DOE Project No. DE-FG36-05G085004, Final Nonproprietary Technical Report. Dec. 28, 2007.
Kamm, et al. Chemical and biochemical generation of carbohydrates from lignocellulose-feedstock (*Lupinus nootkatensis*)—quantification of glucose. Chemosphere. 2006; 62:97-105.
Kim, et al. Continuous Countercurrent Extraction of Hemicellulose from Pretreated Wood Residues. Applied Biochemistry and Biotechnology. 2001; 91-93:253-267.
Kumar, et al. Effect of Enzyme Supplementation at Moderate Cellulase Loadings on Initial Glucose and Xylose Release From Corn Stover Solids Pretreated by Leading Technologies. Biotechnology and Bioengineering. Feb. 1, 2009; 102(2):457-567.
Kumar, et al. Methods for Pretreatment of Lignocellulosic Biomass for Efficient Hydrolysis and Biofuel Production. Ind. Eng. Chem. Res. 2009; 48:3713-3729.
Kunkes, et al. Catalytic conversion of biomass to monofunctional hydrocarbons and targeted liquid-fuel classes. Science. Oct. 17, 2008;322(5900):417-21. doi: 10.1126/science.1159210. Epub Sep. 18, 2008.
Lavarack, et al. The acid hydrolysis of sugarcane bagasse hemicellulose to produce xylose, arabinose, glucose and other products. Biomass and Bioenergy. 2002; 23:367-380.
Lee, et al. Dilute-Acid Hydrolysis of Lignocellulosic Biomass. Advances in Biochemical Engineering/ Biotechnology. 1999; 65:93-115.
Li, et al. Acidolysis of Wood in Ionic Liquids. Ind. Eng. Chem. Res. 2010; 49(7):3126-3136.
Li, et al. Interaction of Supercritical Fluids with Lignocellulosic Materials. Ind. Eng. Chem. Res. 1988; 27:1301-1312.
Martinez, et al. Detoxification of dilute acid hydrolysates of lignocellulose with lime. Biotechnology Progress, American Institute of Chemical Engineers, vol. 17, Jan. 1, 2001, pp. 287-293.
Medical Dictionary: thefreedictionary.com. "Oligosaccharide". Downloaded Mar. 27, 2017. 2 pages.
Michalka, Optimization of Sugar Consumption in the Fermentation of Temulose for Ethanol Production, 2007.
Miller-Ihli et al. Direct determination of lead in sugars using graphite furnace atomic absorption spectrometry. Atomic Spectroscopy, 14(4): 85-89 (1993).
Neureiter et al. Dilute-acid hydrolysis of sugarcane bagasse at varying conditions. Applied Biochemistry and Biotechnology. Mar. 2002, vol. 98, Issue 1-9, pp. 49-58.
Nutrients review.com. "Oligosaccharides". Downloaded Mar. 27, 2017. 4 pages.
Onda et al. Selective Hydrolysis of Cellulose and Polysaccharides into Sugars by Catalytic Hydrothermal Method Using Sulfonated Activated-carbon. Journal of Japan Petroleum Institue.2012; 55(2): 73-86.
Oxford Dictionary. "Oligosaccharide". Downloaded Mar. 27, 2017. 1 page.
Palmqvist, et al. Fermentation of lignocellulosic hydrolysates. II: inhibitors and mechanisms of inhibition. Bioresource Technology. 2000; 74:25-33.
Pessoa Jr, et al. Acid hydrolysis of hemicellulose from sugarcane bagasse. Braz. J. Chem. Eng. vol. 14 No. 3 São Paulo Sep. 1997.
Pohl et al. Direct Determination of the Total Concentrations of Magnesium, Calcium, Manganese, and Iron in Addition to their Chemical and Physical Fractions in Dark Honeys. Anal. Lett., 44(13): 2265-2279 (2011).
Rabinovich. Wood hydrolysis industry in the Soviet Union and Russia: a mini-review. Cellulose Chem. Technol.2010; 44(4-6):173-186.
Radiotis, et al. Optimizing Production of Xylose and Xylooligomers from Wood Chips. 3rd NWBC, Stockholm, Sweden Mar. 23, 2011.
Ragauskas, et al. From wood to fuels Integrating biofuels and pulp production. Industrial biotechnology. 2006; 2(1):55-65.
Saddler et. al. Pretreatment of Lodgepole Pine Killed by Mountain Pine Beetle Using the Ethanol Organosolv Process: Fractionation and Process Optimization. Ind. Eng. Chem. Res. 2007;46: 2609-2617.
Saltberg et al. Removal of metal ions from wood chips during acidic leaching 1: Comparison between Scandinavian softwood, birch and eucalyptus. Nordic Pulp and Paper Research Journal. 2006; 21: 507-512.

(56) References Cited

OTHER PUBLICATIONS

Saltberg, et al. Removal of metal ions from wood chips during acidic leaching 2: Modeling leaching of calcium ions from softwood chips. Nordic Pulp and Paper Research J. 2006; 21(4):513-519.
Sasaki, et al. Cellulose hydrolysis in subcritical and supercritical water. J. of Supercritical Fluids. 1998; 13:261-268.
Schenck. Glucose and Glucose-Containing Syrups. Ullmann's Encyclopedia of Industrial Chemistry, vol. 17, http://dx.doi.org/1 0.1002% 2F14356007.a12_457.pub2, 2006 (pp. 45-66).
Schoenemann. The New Rheinau Wood Saccharification Process. Institute of Chemical Technology. Jul. 27, 1953; 1-49.
Singh, et al. Visualization of Biomass Solubilization and Cellulose Regeneration During Ionic Liquid Pretreatment of Switchgrass. Biotechnology and Bioengineering. Sep. 1, 2009; 104(1):68-75.
Sluiter, et al. Determination of Ash in Biomass, Laboratory Analytical Procedure (LAP), Issue Date: Jul. 17, 2005. Technical Report, NREL/TP-510-42622, Jan. 1, 2008.
Sluiter, et al. Determination of Sugars, Byproducts, and Degradation Products in Liquid Fraction Process Samples. Laboratory Analytical Procedure (LAP), Contract No. DE-AC36-99-GO10337. Issue Date: Dec. 8, 2006.
Sluiter, et al. Determination of Sugars, Byproducts, and Degradation Products in Liquid Fraction Process Samples, Laboratory Analytical Procedure (LAP), Issue Date: Dec. 8, 2006. Technical Report, NREL/TP-510-42623, Jan. 1, 2008.
Sluiter, et al. Determination of Total Solids in Biomass and Total Dissolved Solids in Liquid Process Samples, Laboratory Analytical Procedure (LAP), Issue Date: Mar. 31, 2008. Technical Report, NREL/TP-510-42621, Revised Mar. 2008.
Steele. Recent breakthroughs in enzymes for biomass hydrolysis. Genecor. National Ethanol Conference, Feb. 23-25, 2009, San Antonio, Texas.
Suess. Interaction of organic compounds with calcium carbonate-I. Association phenomena and geochemical implications. Geochimia et Cosmochimic Acata. 1970; 34:157-168.
Sun, et al. Characterization and esterification of hemicelluloses from rye straw. Journal of Agricultural and Food Chemistry. 2000, 48(4), pp. 1247-1252.
Taherzadeh, et al. Pretreatment of Lignocellulosic Wastes to Improve Ethanol and Biogas Production: A Review. Int. J. Mol. Sci. 2008; 9:1621-1651; DOI: 10.3390/ijms9091621.
Terol et al. High-Temperature Liquid Chromatography Inductively Coupled Plasma Atomic Emission Spectrometry hyphenation for the combined organic and inorganic analysis of foodstuffs. J. Chromatography, 1217(40): 6195-6202 (2010).
Trickett. Utilization of Baggase for the production of C5 and C6 sugars. MS Thesis; University of Natal, Durban, South Africa. 1982.
Van Dyke. Enzymatic Hydrolysis of Cellulose—A Kinetic Study. For the degree of Doctor of Science at the Massachusetts Institute of Technology, Sep. 1972.
Vassilev, et al. An overview of the chemical composition of biomass. Fuel, vol. 89, Issue 5, May 2010, pp. 913-933. Available online Nov. 10, 2009.
Veres et al. Studies on matrix effects in the determination of the metal content of sugar complexes by atomic absorption spectrometry. Magyar Kemiai Folyoirat, 93(5): 199-204 (1987).
Winter, et al. NO and N2O formation during the combustion of wood, straw, malt waste and peat. Bioresource Technology. vol. 70, Issue 1, Oct. 1999, pp. 39-49.
Wu et al. Determination of trace calcium in glucose by Zeeman flame atomic absorption spectrometry. Guangdong Weiliang Yuansu Kexue, 14(3): 58-60 (2007).
Wyman. Potential Synergies and Challenges in Refining Cellulosic Biomass to Fuels, Chemicals, and Power. Biotechnol. Prog. 2003; 19:254-262.
Zhang, et al. Cellodextrin preparation by mixed-acid hydrolysis and chromatographic separation. Analytical Biochemistry, 322(2), 2003 (pp. 225-232).
Zhao, et al. Fermentable hexose production from corn stalks and wheat straw with combined supercritical and subcritical hydrothermal technology. Bioscience Technology, vol. 100, Jul. 18, 2009, pp. 5884-5889.
Zhao, et al., Organosolv pretreatment of lignocellulosic biomass for enzymatic hydrolysis, Appl Microbiol Biotechnol (2009) 82:815-827.
Zhao, et al. Supercritical hydrolysis of cellulose for oligosaccharide production in combined technology. Chem. Eng. J. 2009; 150:411-417.
Co-pending U.S. Appl. No. 15/933,210, filed Mar. 22, 2018.
Co-pending U.S. Appl. No. 15/948,837, filed Apr. 9, 2018.
Co-pending U.S. Appl. No. 16/016,467, filed Jun. 22, 2018.
Barton. "Table 18 Hoy's Cohesion Parameters for liquids (and solids and subcooled liquids) at 25°C." in CRC Handboook of solubility parameters and other cohesion parameters, Second Edition, Jan. 1, 1991. CRC Press, Boca Raton, FL. pp. 123-138.
Rangamannar, et al. Improved wet bulk storage of bagasse for newsprint pulp production—part 1. Pulping conference TAPPI proceedings. 1993; 391-398.
Sevcik, et al. Rapid analysis of carbohydrates in aqueous extracts and hydrolysates of biomass using a carbonate-modified anion-exchange column. J Chromatogr A. Mar. 4, 2011;1218(9):1236-43. doi: 10.1016/j.chroma.2011.01.002. Epub Jan. 11, 2011.
Co-pending U.S. Appl. No. 16/560,653, filed Sep. 4, 2019.
Raveendran et al. Influence of mineral matter on biomass pyrolysis characteristics. Fuel 74(12):1812-1822 (1995).
Zhuang et al. Analysis of cellulose hydrolysis products in extremely low acids. Nongye Gongcheng Xuebao 23(2):177-182 (2007). Abstract only. 1 page.
Co-pending U.S. Appl. No. 16/922,199, filed Jul. 7, 2020.
Co-pending U.S. Appl. No. 16/935,619, filed Jul. 22, 2020.
Co-pending U.S. Appl. No. 16/937,200, filed Jul. 23, 2020.
Von Sivers, et al. A techno-economical comparison of three processes for the production of ethanol from pine. Bioresource Technology. 1995; 51:43-52.
Co-pending U.S. Appl. No. 16/849,831, filed Apr. 15, 2020.
Rafiqul et al. Processes for the Production of Xylitol—A Review. Food Reviews International, vol. 9, Issue 29, pp. 127-156 (2013). Accepted author version posted online: Sep. 10, 2012. Published online:Mar. 13, 2013. DOI: https://doi.org/10.1080/87559129.2012. 714434.
Rivas et al. Purification of Xylitol Obtained by the Fermentation of Corncob Hydrolysates. J Agric Food Chem 54:4430-4435 (2006).

\* cited by examiner

INTEGRATED METHODS FOR TREATING LIGNOCELLULOSIC MATERIAL

CROSS REFERENCE TO RELATED APPLICATIONS

This application is a National Stage Entry of PCT/US2016/034194, filed May 25, 2016, which claims the benefit of U.S. Provisional Application No. 62/167,111, filed on May 27, 2015, each incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference. PCT/IL2012/050118 filed on Apr. 2, 2012, PCT/US2013/039585 filed May 3, 2013, PCT/US2013/068824 filed Nov. 6, 2013, PCT/US2014/053956 filed Sep. 3, 2014, PCT/US2016/012384 filed Jan. 6, 2016, U.S. Provisional Patent Application No. 62/091,319 filed on Dec. 12, 2014, U.S. Provisional Patent Application No. 62/100,791 filed Jan. 7, 2015, and U.S. Provisional Patent Application No. 62/167,111 filed May 27, 2015, are each incorporated herein by reference.

BACKGROUND OF THE INVENTION

Processes allowing for the production of cellulosic sugars from biomass at high purity and low cost that are competitive with sugars made from food and feed sources have yet to be developed, despite much effort directed toward this goal worldwide. Biomass is a complex composite material that requires varying degrees of severity to extract and hydrolyze the individual components, each having unique sensitivity to the reaction conditions employed. Thus, a one-step extraction cannot achieve both a high degree of extraction and a low degree of degradation, both essential to achieving high product yield. Furthermore, biomass contains high amounts of other components, including Klasson lignin, acid soluble lignin, inorganic ash compounds, organic extractives, and organic acids. The biorefinery products (i.e. sugars and lignin), are used as feedstock for further conversion processes. To be useful as fermentation or chemical catalysis feedstock, sugars need to be purified to a high degree concomitantly with the elimination of impurities known to be inhibitors of conversion processes. To be economically competitive, efficient low cost processes must be developed and scaled up at minimal capital investment. We disclose herein integrated industrial methods for treating biomass that facilitate the production of high purity sugars and lignin at competitive costs.

SUMMARY OF THE INVENTION

In one aspect, provided herein is a process for the production of hemicellulosic mixed sugars, lignin and glucose from a biomass, comprising: (i) extracting hemicellulose sugars from the biomass, thereby obtaining a hemi-depleted remainder, wherein the hemi-depleted remainder comprises lignin and cellulose; (ii) contacting the hemi-depleted remainder with a lignin extraction solution to produce a lignin extract and a cellulosic remainder; wherein the lignin extraction solution comprises a limited-solubility solvent, a limited-solubility organic acid and water, wherein the limited-solubility solvent and water form an organic phase and an aqueous phase; (iii) separating the lignin extract from the cellulosic remainder, wherein the lignin extract comprises lignin dissolved in the limited-solubility solvent and the cellulosic remainder comprises cellulose and residual lignin; and (iv) contacting the cellulosic remainder with a cellulose hydrolysis solution to hydrolyze cellulose and extract residual lignin; wherein the cellulose hydrolysis solution comprises the limited-solubility solvent, the limited-solubility organic acid and water, wherein the limited-solubility solvent and water form an organic phase and an aqueous phase.

In practicing any of the methods described herein, the cellulosic remainder may be treated with the lignin extraction solution before contacting the cellulosic remainder with a cellulose hydrolysis solution to increase porosity and reduce crystallinity, wherein the treatment comprises contacting the cellulosic remainder with the lignin extraction solution at elevated temperature and pressure and releasing the pressure rapidly to create a solvent explosion effect.

In some embodiments of the process, the limited-solubility organic acid may be recycled by applying one, two, three, or four step(s) selected from: (i) contacting the aqueous stream(s) after phase separation with $CO_2$ at a pressure of at least 2 barg to convert calcium fumarate to fumaric acid and calcium carbonate; (ii) stripping the limited-solubility solvent from the aqueous phase comprising fumaric acid by evaporation to produce a solvent-depleted aqueous phase; (iii) concentrating the aqueous phase comprising glucose and fumaric acid; and (iv) cooling the solvent-depleted aqueous phase to less than 5° C. to cause precipitation of fumaric acid and filtering the precipitate to collect the fumaric acid for further use. In some embodiments, loss of the limited-solubility organic acid per kg of glucose produced may be less than 25 g.

In another aspect, provided herein is a highly purified glucose product characterized by one or more, two or more, three or more, four or more, five or more, or six or more characteristics selected from: (i) monosaccharides in a ratio to total dissolved sugars >0.50 weight/weight; (ii) glucose in a ratio to total monosaccharides >0.90 weight/weight; (iii) xylose in a ratio to total monosaccharides <0.10 weight/weight; (iv) fructose in a ratio to total monosaccharides <0.10 weight/weight; (v) fructose in a ratio to total monosaccharides >0.01 weight/weight; (vi) furfurals in amounts up to 0.01% weight/weight; (vii) phenols in amounts up to 500 ppm; (viii) hexanol in amounts up to 500 ppm; (ix) $C_4$ carboxylic acid in a ratio to total saccharides <0.05 weight/weight; and (x) fumaric acid in a ratio to total saccharides <0.05 weight/weight. In some embodiments, the highly purified glucose product may comprise fumaric acid in an amount less than 0.05% weight/weight. The highly purified glucose product may be used as feed for a fermentation process or chemical conversion process to produce a product.

In still another aspect, provided herein is a process for the hydrolysis of cellulose pulp, comprising: (i) contacting the cellulose pulp with water, a limited-solubility solvent, and a limited-solubility acid; and (ii) heating the cellulose pulp to a temperature of about 200-400° C. In some embodiments, the limited-solubility acid may be a dicarboxylic acid. In some embodiments, the limited-solubility acid may have at least one pKa value between 1.9 and 3.5 in water. In some embodiments, the solubility of the limited-solubility acid in water at 4° C. may be less than 1% wt/wt. In some embodiments, the limited-solubility acid may be fumaric acid. In some embodiments, the limited-solubility solvent may comprise a 4- to 8-carbon ketone. In some embodiments, the limited-solubility solvent may be methylethyl ketone. In some embodiments, at least a portion of the limited-solubility acid may be recovered by precipitation.

In practicing any of the methods described herein, the cellulose pulp may be subjected to a pretreatment step. In some embodiments, the pretreatment step comprises: (i) contacting the cellulose pulp with water, solvent, and a limited-solubility organic acid; (ii) heating the cellulose pulp to a temperature of about 160-220° C. in a closed system; and (iii) opening the closed system to rapidly release pressure.

The present disclosure provides a process for the hydrolysis of cellulose pulp. In some embodiments, the process comprises: (i) contacting the cellulose pulp with water, a limited-solubility solvent, and a limited-solubility acid, thereby forming a slurry; (ii) heating the slurry to a temperature of about 200-400° C., thereby forming a treated slurry; and (iii) recovering a cellulosic hydrolysate from the treated slurry. Optionally, the process further comprises, prior to the contacting step: (a) extracting hemicellulose sugars from a lignocellulosic biomass, thereby obtaining a hemi-depleted remainder, the hemi-depleted remainder comprising lignin and cellulose; (b) treating the hemi-depleted remainder with a limited-solubility solvent, a limited-solubility acid, and water, wherein the limited-solubility solvent and the water form an organic phase and an aqueous phase; and (c) separating the organic phase from the aqueous phase, wherein the aqueous phase comprises the cellulose pulp.

In one aspect, the present disclosure provides a process for the hydrolysis of cellulose pulp. In some embodiments, the process comprises: (i) extracting hemicellulose sugars from a lignocellulosic biomass, thereby obtaining a hemi-depleted remainder, the hemi-depleted remainder comprising lignin and cellulose; (ii) treating the hemi-depleted remainder with a limited-solubility solvent, a limited-solubility acid, and water, wherein the limited-solubility solvent and the water form an organic phase and an aqueous phase; (iii) separating the organic phase from the aqueous phase, wherein the aqueous phase comprises the cellulose pulp; (iv) contacting the cellulose pulp with water, the limited-solubility solvent, and the limited-solubility acid, thereby forming a slurry; (v) heating the slurry to a temperature of about 200-400° C., thereby forming a treated slurry; and (vi) recovering a cellulosic hydrolysate from the treated slurry.

In one aspect, the present disclosure provides a process for the hydrolysis of cellulose pulp, comprising: (i) contacting the cellulose pulp with water, a limited-solubility solvent, and a limited-solubility acid, thereby forming a slurry; (ii) heating the slurry to a temperature of about 200-400° C., thereby forming a treated slurry; and (iii) recovering a cellulosic hydrolysate from the heated slurry. Optionally, the limited-solubility solvent is a 4- to 8-carbon ketone having an aqueous solubility of 10-40% wt/wt at 20° C. Optionally, the limited-solubility acid is a dicarboxylic acid having an aqueous solubility of less than 1% wt/wt at 4° C.

In practicing any of the processes described herein, the limited-solubility acid may be a dicarboxylic acid, such as fumaric acid. Optionally, the limited-solubility acid has at least one pKa value between 1.9 and 3.5 in water. Optionally, solubility of the limited-solubility acid in water at 4° C. is less than 1% wt/wt.

In practicing any of the processes described herein, the limited-solubility solvent may be an organic solvent. Optionally, solubility of the limited-solubility solvent in water at 20° C. is less than 40% wt/wt, such as less than 30% wt/wt. Optionally, solubility of the limited-solubility solvent in water at 20° C. is 20-40% wt/wt. Preferably, the limited-solubility solvent comprises a 4- to 8-carbon ketone, such as methylethyl ketone.

Any process described herein may further comprise recovering the limited-solubility acid by precipitation. In some examples, at least 80% of the limited-solubility acid is recovered, such as at least 95% of the limited-solubility acid.

Any process described herein may further comprise pretreating the cellulose pulp prior to the contacting step. Optionally, the pretreating comprises: (a) contacting the cellulose pulp with water, a limited-solubility solvent, and a limited-solubility acid, thereby forming a pretreatment slurry; (b) heating the pretreatment slurry to a temperature of about 160-220° C. in a closed system; and (c) opening the closed system to rapidly release pressure.

In some embodiments, the cellulose pulp comprises: (i) cellulose; (ii) hemicellulose in an amount up to 5% weight/weight relative to total solids; (iii) ash in an amount up to 6% weight/weight relative to total solids; and (iv) sulfate in an amount up to 3% weight/weight relative to total solids. Optionally, the cellulose pulp may further comprise lignin. Optionally, the cellulose pulp comprises less than 5% water soluble carbohydrates at 20° C. Optionally, a process described herein comprises at least 10 kg of the cellulose pulp, such as at least 50 kg.

In some embodiments, the recovering the cellulosic hydrolysate comprises phase separation of an aqueous phase comprising the cellulosic hydrolysate from an organic phase comprising the limited-solubility solvent. Optionally, the process further comprises contacting the aqueous phase with $CO_2$ at a pressure of at least 2 barg to produce a carbonated aqueous phase. Optionally, the process further comprises cooling the carbonated aqueous phase to less than 10° C., thereby forming a precipitate comprising the limited-solubility acid. Optionally, the process further comprises separating the precipitate from the cold carbonated aqueous phase.

The present disclosure provides a sugar composition comprising: (i) monosaccharides in a ratio to total dissolved sugars >0.50 weight/weight; (ii) glucose in a ratio to total monosaccharides >0.90 weight/weight; (iii) xylose in a ratio to total monosaccharides <0.10 weight/weight; (iv) fructose in a ratio to total monosaccharides <0.10 weight/weight; (v) furfurals in amounts up to 0.01% weight/weight; (vi) phenols in amounts up to 500 ppm; and (vii) hexanol or 2-ethyl-1-hexanol in amounts up to 500 ppm. Optionally, the composition comprises glucose in a ratio to total monosaccharides of 0.90 to 0.99 weight/weight. Optionally, the composition comprises fructose in a ratio to total monosaccharides of at least 0.01 weight/weight. Optionally, the composition comprises xylose in a ratio to total monosaccharides of at least 0.01 weight/weight. Optionally, any composition provided herein comprises at least 10 ppb fumaric acid. Optionally, the composition comprises at least 10 ppb furfural. Optionally, the composition comprises at least 10 ppb phenols. In some examples, the phenols are lignin decomposition products. Optionally, the composition comprises at least 10 ppb hexanol or 2-ethyl-1-hexanol. Optionally, the composition comprises at least 10 ppb methylethyl ketone. Optionally, the composition comprises C6 oligosaccharides in a ratio to total dissolved sugars of 0.01 to 0.10 weight/weight.

DETAILED DESCRIPTION OF THE INVENTION

The present disclosure relates to the integrated processing and refining of lignocellulosic biomass to produce high purity sugars and lignin at high yields and low costs. The sugar products may comprise a hemicellulosic sugar product, a cellulosic sugar product, or a mixed sugar product. The relative parts of C6 and C5 saccharides in the sugar product depend on the biomass used as feedstock, and may be enriched with a specific saccharide by applying separation processes to the refined sugar products.

In some embodiments, the overall integrated process may comprise three extraction steps, each one designed and optimized to extract preferentially one crude component that can be refined to a pure product stream while minimizing degradation of the extracted component and the remaining solids.

Figure 1:
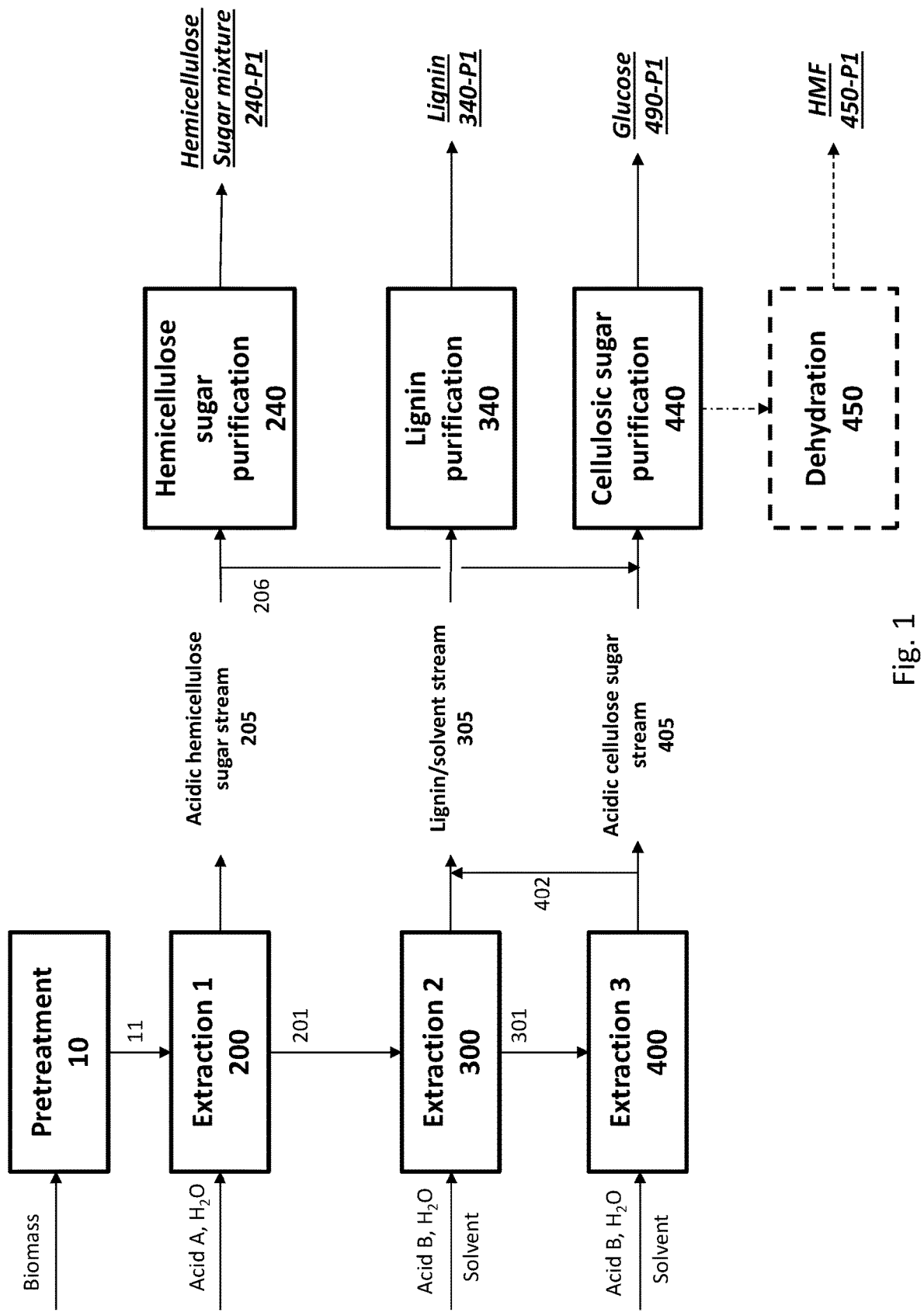
FIG. 1 shows a schematic stepwise process for extracting and refining hemicellulose, cellulose and lignin from biomass.
Figure 2:
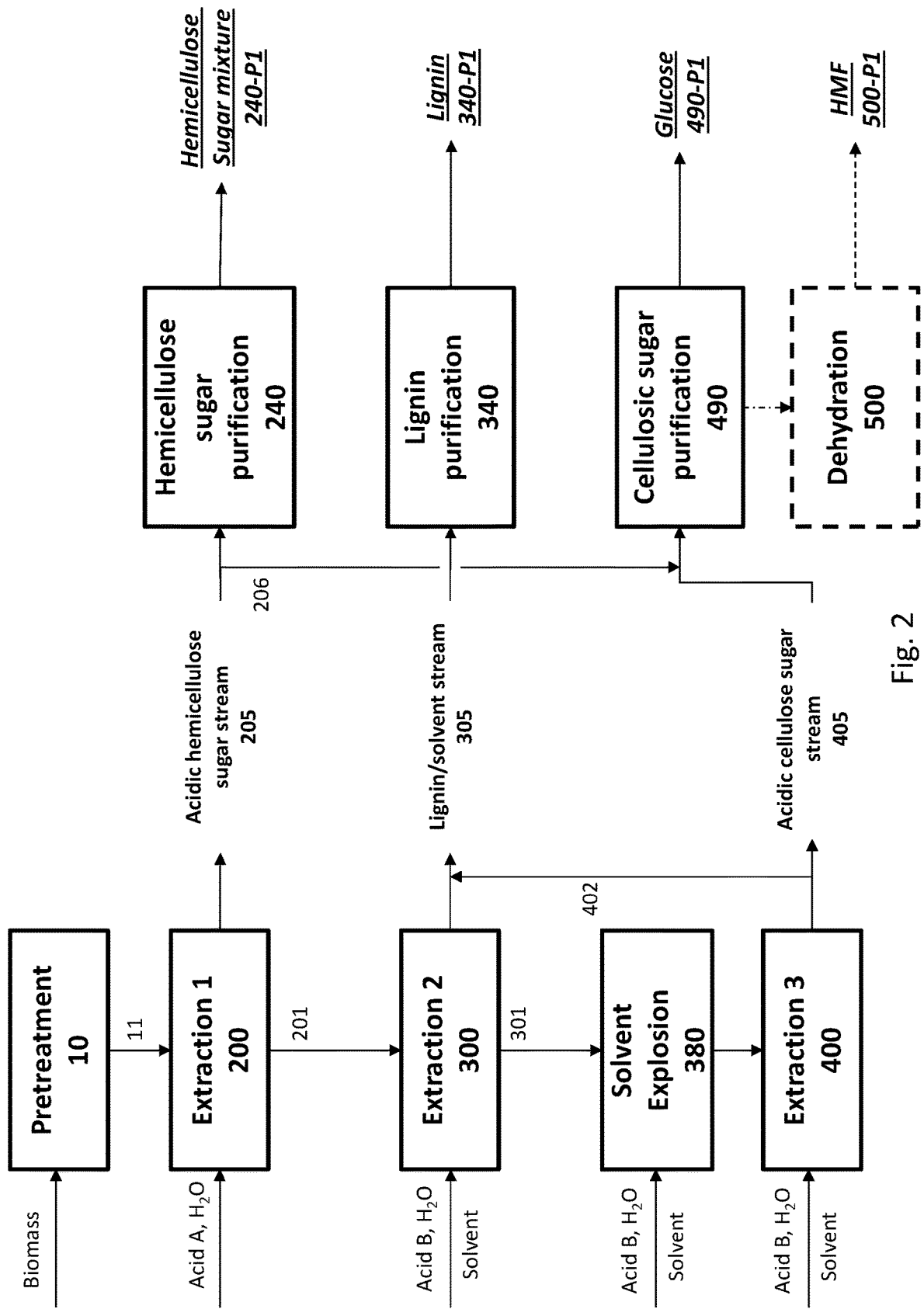
FIG. 2 shows an alternative stepwise process for extracting and refining hemicellulose, cellulose and lignin from biomass.

FIG. 1 presents a scheme of a sequential overall process comprising the following major stages. Optionally, the process comprises a pretreatment process 10, where the biomass is prepared for extraction. Such pretreatment may include, but is not limited to, chipping, sizing, grinding, de-barking, de-soiling, de-ashing, washing, drying or slurrying. Next, three extraction steps may be applied at increasing severity, thus optimizing the conditions to first extract and hydrolyze biomass components that are easier to extract but may be more sensitive to degradation, and later extracting the harder to extract and hydrolyze parts of biomass, the most calcitrant being the crystalline fraction of cellulose. FIG. 2 is an alternative scheme, where before extraction 3, a solvent explosion step is added, aiming to open up the crystalline structure of cellulose to facilitate effective hydrolysis of the crystalline cellulose at a lower temperature than can be achieved using the equivalent pressure drop of steam explosion alone, due to the vapor pressure of the selected solvent. The overall process and the integration of the different stages to establish an economically competitive biorefining industrial process will now be described in detail.

Extraction 1, designated as process 200 in FIG. 1 and FIG. 2, is designed to extract and hydrolyze hemicellulosic sugars. Extraction 1 may be optimized to hydrolyze acetate groups that decorate xylan polymers, as well as to extract ash, extractives, proteins, acid soluble lignin and essentially any acid soluble compound present in the biomass. Such a process was disclosed in detail in PCT/US2013/039585 filed May 3, 2013, PCT/US2013/068824 filed Nov. 6, 2013, PCT/US2014/053956 filed Sep. 3, 2014 and U.S. Provisional Patent Application No. 62/100,791 filed Jan. 7, 2015, each incorporated herein by reference. The liquor produced in the extraction process may be separated from the remaining solids to produce acidic hemicellulose sugar stream 205 and hemicellulose-depleted solid stream 201. Stream 205 may be purified to obtain a hemicellulose sugar mixture 240-P1, or alternatively may be directed to stream 206 and treated together with the acidic cellulosic sugar stream 405 in one purification system.

Preferably, an aqueous acidic solution is used to extract and hydrolyze hemicellulosic sugars from lignocellulosic biomass. The aqueous acidic solution can contain any acids, inorganic or organic. Preferably, an inorganic acid is used. For example, the solution can be an acidic aqueous solution containing an inorganic or organic acid such as $H_2SO_4$, $H_2SO_3$ (which can be introduced as dissolved acid or as $SO_2$ gas), HCl, or acetic acid. The acidic aqueous solution can contain an acid in an amount of 0 to 2% acid or more, e.g., 0-0.2%, 0.2-0.4%, 0.4-0.6%, 0.6-0.8%, 0.8-1.0%, 1.0-1.2%, 1.2-1.4%, 1.4-1.6%, 1.6-1.8%, 1.8-2.0% or more weight/weight. Preferably, the aqueous solution for the extraction includes 0.2-0.7% $H_2SO_4$ and 0-3,000 ppm $SO_2$. The pH of the acidic aqueous solution can be, for example, in the range of 1-5, preferably 1-3.5, more preferably 1-2.

In some embodiments, an elevated temperature or pressure is preferred in the extraction. For example, a temperature in the range of 100-200° C., or more than 50° C., 60° C., 70° C., 80° C., 90° C., 100° C., 110° C., 120° C., 130° C., 140° C., 150° C., 160° C., 170° C., 180° C., 190° C., or 200° C. can be used. Preferably, the temperature is in the range of 110-160° C., 120-150° C., or 140-150° C. Preferably, the temperature is 135-165° C. The pressure can be in the range of 0.4-10 mPa, for example, 0.4-5 mPa. The solution can be heated for 0.1-5 hours, preferably 0.1-3 hours, 0.1-1 hour, 1-2 hours, or 2-3 hours. The extraction process may have a cooling down period of less than one hour.

Optionally, hemicellulose sugars are extracted from the biomass in an aqueous acidic solution comprising $H_2SO_4$ at a pH of 1-3.5. Optionally, hemicellulose sugars are extracted from the biomass in 0.1-3 hours at a temperature of 135-165° C. and a pressure of 0.4-5 mPa. Preferably, hemicellulose sugars are extracted from the biomass in an aqueous acidic solution comprising $H_2SO_4$ at a pH of 1-3.5, wherein the reaction mixture comprising the biomass and the aqueous acidic solution is heated for 0.1-3 hours to a temperature of 135-165° C.

In some embodiments, impurities such as ash, acid soluble lignin, fatty acids, organic acids such as acetic acid and formic acid, methanol, proteins and/or amino acids, glycerol, sterols, rosin acid and waxy materials may be extracted together with the hemicellulose sugars under the same conditions. These impurities can be separated from the aqueous phase by solvent extraction (e.g., using a solvent containing amine and alcohol).

In some embodiments, hemicellulose sugar extraction 200 can produce, in one single extraction process, a hemicellulose sugar stream 205 containing at least 80-95% monomeric sugars relative to total sugars. For example, the hemicellulose sugar stream can contain more than 80%, 85%, 90%, 91%, 92%, 93%, 94%, 95%, 96%, 97%, 98%, or 99% wt/wt monomeric sugars relative to total sugars. In addition, the present method produces minimal amounts of lignocellulose degradation products such as furfural, levulinic acid, and formic acid. For example, the hemicellulose sugar stream may contain less than about 0.5, 0.4, 0.3, 0.2, or 0.1% wt/wt phenols. In some examples, the hemicellulose sugar stream may contain less than about 0.6, 0.5, 0.4, 0.3, 0.2, or 0.1% wt/wt furfural. In some examples, the hemicellulose sugar stream may contain less than about 0.01 or 0.005% wt/wt HMF. In some examples, the hemicellulose sugar stream may contain less than about 0.05, 0.04, 0.03, or 0.02% wt/wt formic acid. In some examples, the hemicellulose sugar stream may contain less than about 0.05, 0.04, 0.03, or 0.02% wt/wt levulinic acid. In some embodiments, a xylose yield greater than 80% of theoretical value may be achieved. In some embodiments, at least 70%, 75%, 80%, or more of the hemicellulose sugars may be extracted using the present method.

The extraction of hemicellulose sugars from the biomass results in a lignocellulosic remainder comprising lignin and cellulose, with only a small residue of hemicellulose. In some embodiments, the extraction of hemicellulose sugars does not remove a substantial amount of the cellulosic sugars. For example, the extraction of hemicellulose sugars does not remove more than 1, 2, 5, 10, 15, 20, 30, 40, 50, or 60% weight/weight cellulose. In some embodiments, the lignocellulosic remainder contains less than 50, 45, 40, 35, 30, 25, 20, 15, 10, 5, 2, or 1% wt/wt hemicellulose. In some embodiments, the lignocellulose remainder contains less than 10, 9, 8, 7, 6, 5, 4, 3, 2, or 1% wt/wt ash.

Hemicellulose sugar stream 205 is optionally refined and optionally fractionated according to the process disclosed in PCT/US2013/039585, incorporated herein by reference. Examples of compositions of refined hemicellulose sugar mixtures, xylose enriched sugar mixtures and xylose removed sugar mixtures are incorporated in this disclosure in the examples section.

Alternatively, stream 205 comprising acidic hemicellulose sugars may be combined before refining through stream 206 with acidic cellulosic sugar stream 405, which will be described below. In cases where the biomass feedstock used is high in C6 sugars, combining the two streams before purification is advantageous, as only one purification system is required to achieve a high purity sugar product rich in C6 sugars, thus reducing capital costs associated with this integrated process.

Figure 3A:
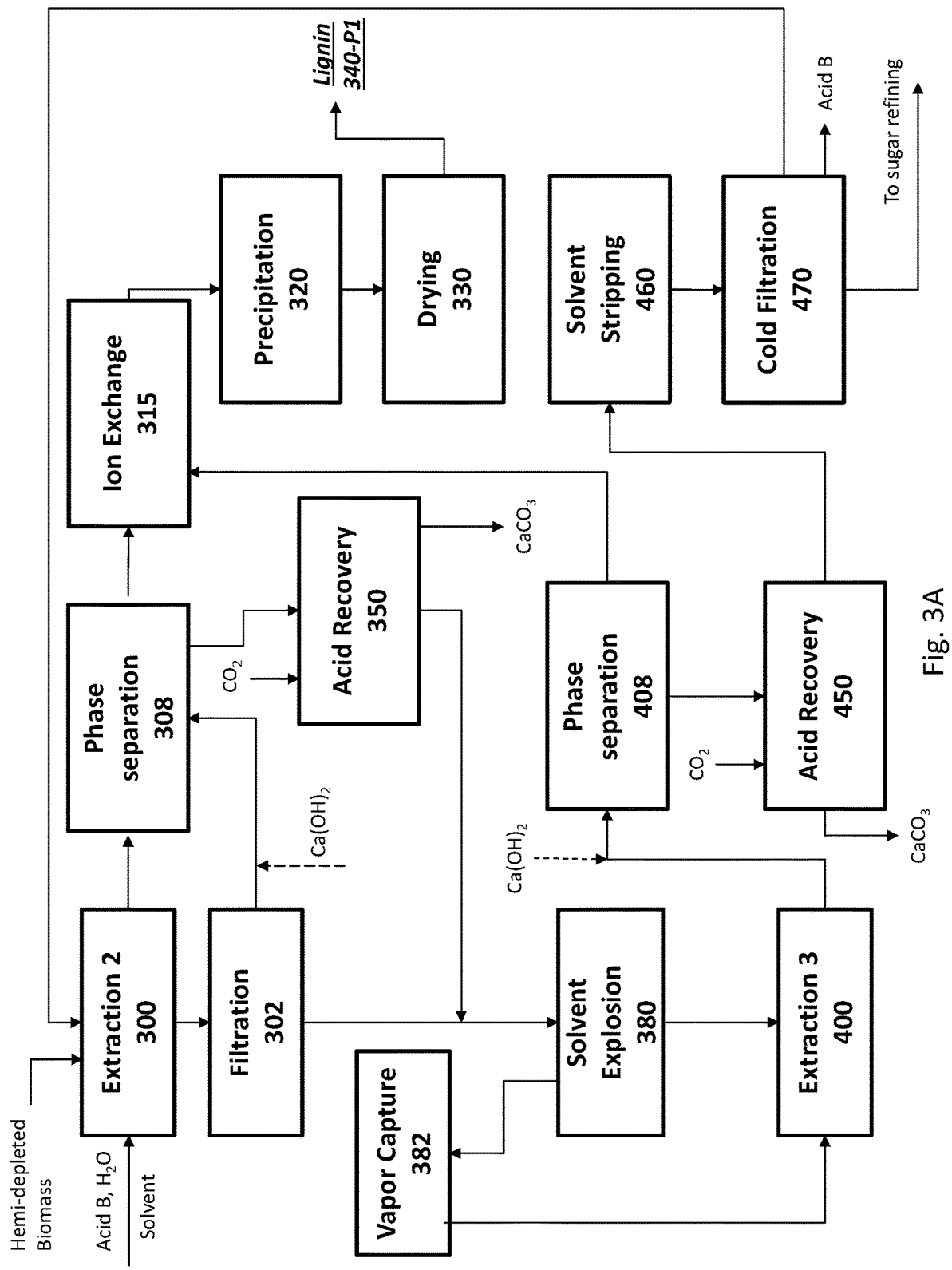
FIG. 3A shows a scheme for integrated processes for extracting and refining lignin and hydrolyzing cellulose to glucose, while recycling chemicals used in the process.

Next, as outlined in FIGS. 3A and 3B, lignin may be extracted from hemicellulose-depleted biomass 201 in extraction 300, then further refined as described in more detail below. The remaining solids, comprising predominantly cellulose, are then treated in Extraction 3 (process 400) to fully hydrolyze cellulose to glucose. Glucose may then be refined to high purity glucose (490-P1). Optionally, before Extraction 3, the solid material may be treated in solvent explosion process 380 to open the crystalline structure of cellulose to facilitate the use of milder conditions in Extraction 3. A fundamental embodiment of this invention is the reuse of all solvents and chemicals applied in the process for multiple uses. For example, at least 50%, 60%, 70%, 80%, 90%, 95%, or 98% of all solvents and chemicals may be recycled. The recycling circuits are shown schematically in FIG. 3. Extraction 2 and 3 are described in detail in the following sections.

Extraction 2 is designated as process 300 in FIG. 1-3. This extraction is designed to extract lignin into an organic solvent phase of a solvent having limited solubility in water. PCT/US2013/039585 and PCT/US2013/068824 disclose a process of producing high purity lignin from a biomass, comprising: (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent; and optionally further comprising one, two, three or four additional step(s): (iv) distilling or flash evaporating the lignin extract thereby removing the bulk of the limited-solubility solvent from the lignin extract to obtain a solid lignin; (v) heating the solid lignin thereby removing trace limited-solubility solvent or water from the solid lignin; (vi) applying a vacuum to the solid lignin thereby removing trace limited-solubility solvent or water from the solid lignin; and (vii) dissolving the solid lignin with an organic solvent to form a resulting solution and separating the resulting solution from insoluble remainder.

It is realized in the current disclosure and is a fundamental embodiment in this disclosure that it is advantageous to use in this process an acid that has limited solubility in water. In some embodiments, the acid is an organic acid. In some embodiments, the acid has limited solubility in an aqueous solution that is saturated with the limited-solubility solvent. In some embodiments, the acid has limited solubility in the limited-solubility solvent that is saturated with water. In some embodiments, the solubility of the acid in water, in solvent-saturated water or in water-saturated solvent is highly temperature dependent. In some embodiments, the solubility of the acid is higher in the limited-solubility solvent than in water, and is highest in water-saturated solvent. In some embodiments, the partition coefficient of the acid between the limited-solubility solvent and water is greater than 1, 2, 3, 4, 5, 6, 7, 8, 9, or 10. In some embodiments, the solubility of the acid in water at 4° C. is less than 1%, 0.5%, or 0.3% wt/wt. In some embodiments, the solubility of the acid in water at 20° C. is less than 100, 75, 50, 40, 30, 25, 20, 15, 10, or 5 g/L. In some embodiments, the solubility of the acid in water at 20° C. is between 1-10, 1-5, or 3-5 g/L. In some embodiments, the solubility of the acid in water at 20° C. is about 4 g/L. In some embodiments, the acid has at least one pKa value lower than 4.8, 4.0, 3.7, 3.5, 3.2, or 3.0. In some embodiments, the acid has at least one pKa value between 1.9 and 3.5 in water. In some embodiments, the acid has at least one pKa value between 2.5 and 3.5 in water. In some embodiments, the acid is a dicarboxylic acid. In some embodiments, the acid is a $C_4$ carboxylic acid. In some embodiments, the acid is selected form fumaric acid, maleic acid and malic acid. In some embodiments, the acid is fumaric acid. The acid used in lignin extraction may be referred to herein as a limited-solubility acid.

In some embodiments, the limited-solubility solvent is an organic solvent. In some embodiments, the limited-solubility solvent includes one or more of esters, ethers and ketones with 4- to 8-carbon atoms. In some embodiments, the limited-solubility solvent is a 4- to 8-carbon ketone, such as methylethyl ketone. Examples of limited-solubility solvents suitable for the present invention include methylethyl ketone, diethyl ketone, methyl isopropyl ketone, methyl propyl ketone, mesityl oxide, diacetyl, 2,3-pentanedione, 2,4-pentanedione, 2,5-dimethylfuran, 2-methylfuran, 2-ethylfuran, 1-chloro-2-butanone, methyl tert-butyl ether, diisopropyl ether, anisol, ethyl acetate, methyl acetate, ethyl formate, isopropyl acetate, propyl acetate, propyl formate, isopropyl formate, 2-phenylethanol, toluene, 1-phenylethanol, phenol, m-cresol, 2-phenylethyl chloride, 2-methyl-2H-furan-3-one, γ-butyrolactone, acetal, methyl ethyl acetal, dimethyl acetal, morpholine, pyrrole, 2-picoline, and 2,5-dimethylpyridine. In some embodiments, the solubility of the limited-solubility solvent in water is less than 50%, 45%, 40%, 35%, 30%, 29%, 28%, 27%, 26% or less than 25% weight/weight at 20° C., such as less than 40% weight/weight. Preferably, the solubility of the limited-solubility solvent in water is less than 30% weight/weight at 20° C. In some embodiments, the solubility of the limited-solubility solvent in water is 20-40% weight/weight at 20° C.

The ratio of the limited-solubility solvent to water suitable for carrying out the lignin extraction can vary depending on the biomass material and the particular limited-solubility solvent used. In some embodiments, the solvent to water ratio is in the range of 100:1 to 1:100, e.g., 50:1 to 1:50, 20:1 to 1:20, and preferably 1:1.

Elevated temperatures and/or pressures are preferred in some lignin extraction embodiments. For example, the temperature of lignin extraction may be in the range of 50-300° C., preferably 160-220° C., e.g., 170-200° C. The pressure may be in the range of 1-30 mPa, preferably, 12-26 mPa. The solution may be heated for 0.5-24 hours, preferably 1-3 hours.

Optionally, lignin is extracted from a lignocellulosic remainder (i.e., a hemicellulose-depleted biomass) by contacting the lignocellulosic remainder with a lignin extraction solution to produce a lignin extract and a cellulosic remainder; wherein the lignin extraction solution comprises a limited-solubility solvent, a limited-solubility acid, and water, wherein the limited-solubility solvent and water form an organic phase and an aqueous phase. Preferably, solubility of the limited-solubility acid in water at 4° C. is less than about 1% wt/wt, and solubility of the limited-solubility solvent in water at 20° C. is less than about 30% wt/wt. Optionally, the limited-solubility acid is fumaric acid, and the limited-solubility solvent is methylethyl ketone.

Returning to FIG. 3A, after extraction 300 the effluent of the reactor may be separated. In some embodiments, the remaining solid, which contains mostly cellulose, is filtered 302 and optionally washed with solvent to remove residual lignin. The collected solid (i.e., cellulose pulp) is transferred to the next stage in the overall process, i.e. Extraction 3, 400 in FIG. 1, or optionally solvent explosion 380 in FIG. 2 and FIG. 3A.

Optionally, the cellulose pulp comprises at least 70%, 80%, 85%, 90%, 95%, 96%, 97%, or at least 98% cellulose, such as at least 80% cellulose. Optionally, the cellulose pulp further comprises hemicellulose sugars in an amount up to 10%, 7.5%, 5%, 4%, 3%, 2%, 1%, or up to 0.5% weight/weight relative to total solids, such as up to 5% hemicellulose sugars. Optionally, the cellulose pulp comprises 0.01-5% hemicellulose sugars, such as 0.01-1% hemicellulose sugars. Optionally, the cellulose pulp further comprises ash in an amount up to 8%, 7%, 6%, 5%, 4%, 3%, 2%, 1%, 0.5%, or up to 0.1% weight/weight relative to total solids, such as up to 6% ash. Optionally, the cellulose pulp comprises 0.001-6% ash, such as 0.001-2% ash. Optionally, the cellulose pulp further comprises sulfate in an amount up to 5%, 4%, 3%, 2%, 1%, 0.5%, or up to 0.1% weight/weight relative to total solids, such as up to 3% sulfate. Optionally, the cellulose pulp further comprises lignin in an amount up to 20%, 15%, 10%, 7.5%, 5%, 4%, 3%, 2%, 1% or up to 0.5% weight/weight relative to total solids as determined by the NREL/TP-510-42618 method, such as up to 15% lignin. Optionally, the cellulose pulp comprises water soluble carbohydrates in an amount up to 10%, 9%, 8%, 7%, 6%, 5%, 4%, 3%, 2%, or up to 1% weight/weight relative to total solids, such as up to 5% water soluble carbohydrates, wherein the solubility is measured at 20° C. Optionally, the cellulose pulp comprises cellulose, hemicellulose in an amount up to 5% weight/weight relative to total solids, ash in an amount up to 4% weight/weight relative to total solids, and sulfate in an amount up to 3% weight/weight relative to total solids.

Optionally, the organic phase that contains the dissolved lignin is separated 308 from the aqueous phase that contains residual dissolved sugars and ionic species. Optionally, before separation 308, $Ca(OH)_2$ is added to the solution to bring the pH of the aqueous phase to 3.5-3.8. Other suitable bases known in the art may be used to adjust the pH, including, for example, $Mg(OH)_2$, NaOH, KOH, and others. In some embodiments, the separated organic phase comprises at least 3%, 4%, 5%, 6%, 7%, 8%, 9%, or 10% lignin wt/wt.

The aqueous phase of separation 308 is optionally treated with high pressure $CO_2$ gas, i.e. at 2-10, 3-8, or 4-5 barg, to convert any salts of the acid to the acid and carbonate salts. Optionally, $Ca(OH)_2$ is added to the aqueous phase of separation 308 to raise the pH. The $Ca(OH)_2$-treated aqueous phase may be treated with $CO_2$ gas, i.e. at 2-10, 3-8, or 4-5 barg, to convert any calcium salts of the acid to the acid and calcium carbonate. In some embodiments, calcium carbonate is precipitated and removed by filtration.

Optionally, the acid is used in the lignin extraction process is fumaric acid. The aqueous phase of separation 308 is optionally treated with high pressure $CO_2$ gas, i.e. at 2-10, 3-8, or 4-5 barg, to convert any calcium fumarate to fumaric acid and calcium carbonate. In some embodiments, calcium carbonate is precipitated and removed by filtration.

In some embodiments, the lignin containing organic phase is contacted 315 with a strongly acidic cation exchange resin (SAC) to remove residual cations. Lignin may be precipitated by flash evaporation 320 of the limited-solubility solvent in contact with hot water, and the collected lignin dried 330 to produce high purity lignin 340-P1. Detailed embodiments of the lignin refining process are disclosed in PCT/US2013/039585 and PCT/US2013/068824, incorporated herein by reference.

In some embodiments, the aqueous phase comprising limited-solubility acid, such as fumaric acid, is combined again with the solids (e.g., cellulose pulp) remaining from Extraction 2. Optionally, additional limited-solubility solvent is added. The combined slurry may be heated to a temperature sufficient to create high pressure, preferably 160 to 220° C., e.g., 170-200° C. The slurry may be maintained at high temperature for 1-30 minutes (e.g., 5-15 minutes) and the pressure released rapidly through a vent. In some embodiments, the vapors comprising limited-solubility solvent and water are collected in a condenser 382 and directed to be used in Extraction 3, 400 in FIG. 3A. In some embodiments, various explosion techniques are applied as pretreatment of biomass, i.e. techniques by which gas or vapors are created by heat and pressure and the pressure released abruptly to cause an explosive effect on the biomass fibers (see for example Kumar et. al., *Ind. Eng. Chem. Res.* (2009), 48, 3713-3729). Known techniques include steam explosion, ammonia explosion, and $CO_2$ explosion. Application of such processes to biomass treatment has multiple purposes, including, for example, the removal of hemicellulose and lignin from cellulose fibers, reduction of the crystallinity of cellulose, and increasing the porosity of cellulose to improve enzymatic or chemical digestion. However, achieving these goals in one step is difficult, since the severe conditions required for sufficiently high removal of hemicellulose and lignin also severely degrade these products, making later refining of hemicellulose and lignin products difficult, less attractive and less economical.

In some embodiments, a mixture of water and methylethyl ketone (MEK) is used as the limited-solubility solvent that is heated to create high pressure that is rapidly dropped to cause an explosive effect on the cellulose fibers. In some embodiments, the pressure difference between the high and low pressures is about 2.5, 3.0, 3.5, 4.0, 4.5, or 5.0 MPa. In some embodiments, the temperature required to achieve such pressure is about 130, 135, 140, 145, 150, 155, 160, 165, 170, 175, 180, 185, or 190° C. In some embodiments, the use of a volatile solvent in the mixture allows for higher pressures at lower temperatures than steam alone. In some embodiments, the efficacy of solvent explosion is enhanced by applying pressure to cellulose pulp that is already well impregnated with the liquid phase from the previous process step (i.e., lignin extraction). In some embodiments, once exploded, the slurry is immediately transferred to Extraction 3.

Optionally, prior to Extraction 3, the cellulose pulp is pretreated. In some embodiments, the pretreating comprises (a) contacting the cellulose pulp with water, a limited-solubility solvent, and a limited-solubility acid, thereby forming a pretreatment slurry; (b) heating the pretreatment slurry to a temperature of about 160-220° C. in a closed system; and (c) opening the closed system to rapidly release pressure. The resultant cellulose pulp may be used directly in Extraction 3.

Extraction 3 is designated as process 400 in FIG. 1-3. Extraction 3 is designed to hydrolyze cellulose in the remaining pulp and to dissolve lignin residues in the organic phase. In some embodiments, the remaining mostly cellulosic solid (e.g., the cellulose pulp) is treated with a mixture of water, solvent and acid. In some embodiments, the acid is an organic acid. In some embodiments, the solvent is a limited-solubility solvent. In some embodiments, little or no hemicellulose remains in the pulp at this stage after two extractions (i.e., Extraction 1 and Extraction 2), and the severity of conditions may be increased to hydrolyze cellulose to monomeric glucose with little or no risk of damage to the more sensitive sugars. In some embodiments, temperature, pressure and acid concentration are increased such that the reaction time to achieve full conversion of solid cellulose to water soluble oligomers and monomers is less than 60, 50, 40, 30, or 20 minutes. In some embodiments, the temperature is about 200-400° C., for example, 220-280° C. In some embodiments, the pressure is about 2.5, 3.0, 3.5, 4.0, 4.5, or 5.0 MPa. In some embodiments, the acid concentration is about 1%, 2%, 3%, 4%, 5%, 6%, or 7% wt/wt. The reaction may be conducted in a batch reactor or in a flow reactor.

In certain embodiments, provided herein is a process for the hydrolysis of cellulose pulp. The process may comprise: (i) contacting the cellulose pulp with water, a limited-solubility solvent, and a limited-solubility acid, thereby forming a slurry; (ii) heating the slurry to a temperature of about 200-400° C., thereby forming a treated slurry; and (iii) recovering a cellulosic hydrolysate from the treated slurry.

In certain embodiments, provided herein is a process for the hydrolysis of cellulose pulp. The process may comprise: (i) contacting the cellulose pulp with water, a limited-solubility solvent, and a limited-solubility acid, thereby forming a slurry; (ii) heating the slurry to a temperature of about 200-400° C., thereby forming a treated slurry; and (iii) recovering a cellulosic hydrolysate from the treated slurry, wherein the limited-solubility solvent is a 4- to 8-carbon ketone having an aqueous solubility of 10-40% wt/wt at 20° C., and wherein the limited-solubility acid is a dicarboxylic acid having an aqueous solubility of less than 1% wt/wt at 4° C. Optionally, the limited-solubility acid is fumaric acid. Optionally, the limited-solubility solvent is methylethyl ketone.

In some embodiments, recovering the cellulosic hydrolysate from the treated slurry comprises phase separation of an aqueous phase comprising the cellulosic hydrolysate from an organic phase comprising the limited-solubility solvent. Optionally, the aqueous phase is contacted with $CO_2$ at a pressure of at least 2 barg to produce a carbonated aqueous phase. In some examples, the carbonated aqueous phase is cooled to less than 10° C., such as less than 5° C., thereby forming a precipitate comprising the limited-solubility acid. Optionally, the precipitate is separated from the aqueous phase.

In some embodiments, the process for the hydrolysis of cellulose pulp is conducted at an industrial scale. Optionally, at least 1 kg, 5 kg, 10 kg, 50 kg, 100 kg, 250 kg, 500 kg, or at least 1000 kg of cellulose pulp, such as at least 10 kg of cellulose pulp is hydrolyzed in a single batch. Optionally, the hydrolysis produces at least 1 kg, 5 kg, 10 kg, 50 kg, 100 kg, 250 kg, or at least 500 kg of glucose, such as at least 5 kg of glucose, in a single batch.

In some embodiments, the acid is a limited-solubility acid. In some embodiments, the acid has limited solubility in an aqueous solution that is saturated with the limited-solubility solvent. In some embodiments, the acid has limited solubility in the limited-solubility solvent that is saturated with water. In some embodiments, the solubility of the acid in water, in solvent-saturated water or in water-saturated solvent is highly temperature dependent. In some embodiments, the solubility of the acid is higher in the solvent than in water, and is highest in water-saturated solvent. In some embodiments, the partition coefficient of the acid between the limited-solubility solvent and water is greater than 1, 2, 3, 4, 5, 6, 7, 8, 9, or 10. In some embodiments, the solubility of the acid in water at 4° C. is less than 1%, 0.5%, or 0.3% wt/wt. In some embodiments, the solubility of the acid in water at 20° C. is less than 100, 75, 50, 40, 30, 25, 20, 15, 10, or 5 g/L. In some embodiments, the solubility of the acid in water at 20° C. is between 1-10, 1-5, or 3-5 g/L. In some embodiments, the solubility of the acid in water at 20° C. is about 4 g/L. In some embodiments, the limited-solubility acid has at least one pKa value lower than 4.8, 4.0, 3.7, 3.5, 3.2, or 3.0. In some embodiments, the limited-solubility acid has at least one pKa value between 1.9 and 3.5 in water. In some embodiments, the limited-solubility acid has at least one pKa value between 2.5 and 3.5 in water. In some embodiments, the limited-solubility acid is a dicarboxylic acid. In some embodiments, the limited-solubility acid is a $C_4$ carboxylic acid. In some embodiments, the limited-solubility acid is selected form fumaric acid, maleic acid and malic acid. In some embodiments, the limited-solubility acid is fumaric acid.

In some embodiments, Extraction 3 yields a hydrolysate aqueous phase and a lignin organic phase. In some embodiments, no solid remains at the end of Extraction 3. In some embodiments, any solid remaining at the end of Extraction 3 is collected and combined with the feed into solvent explosion 380 or the feed into Extraction 3. In some embodiments, the concentration of sugar in the hydrolysate (i.e. sugar/(sugar+water) concentration) is at least 5%, 8%, 10%, 12%, 15%, or 20% wt/wt. In some embodiments, the concentration of sugar in the hydrolysate is less than 25%, 20%, 15%, 12%, 10%, 8%, or 5% wt/wt. Optionally, the concentration of sugar in the hydrolysate is 1-25% wt/wt, such as 5-25% wt/wt. In some embodiments, the concentration of monomers relative to total sugars is at least 50%, 60%, 70%, 80%, 85%, 90%, or 95% wt/wt. In some embodiments, the concentration of lignin in the organic phase is at least 0.2%, 0.5%, 1%, 1.5%, 2%, 3%, 4%, or 5% lignin wt/wt.

In some embodiments, the concentration of monomers relative to total sugars in the hydrolysate is less than 95%, 90%, 85%, 80%, 70%, 60%, or 50% wt/wt. Optionally, the hydrolysate is heated to about 90-130° C. for about 20-120 minutes. The heating may cause hydrolysis of oligomers to monomers. In some embodiments, the concentration of total sugars in the solution is modified prior to the hydrolysis of oligomers to monomers. The concentration of total sugars in the solution may be reduced, optionally by dilution with water. The concentration of total sugars in the solution may be increased, optionally by the removal of water by evaporation. Preferably, the concentration of total sugars in the solution is modified to be less than 20%, 15%, 12%, 10%, 8%, or less than 6% wt/wt. In some embodiments, the further hydrolysis of oligomers to monomers described herein is done before treating the aqueous phase with base and/or $CO_2$, as described below. In some embodiments, the further hydrolysis of oligomers to monomers described herein is done after treating the aqueous phase with base and/or $CO_2$.

The stream coming out of Extraction 3 may be phase separated in process 408. Optionally, $Ca(OH)_2$ is added before phase separation to adjust the pH to the range of 3.5-3.8. Other suitable bases known in the art may be used to adjust the pH, including, for example, $Mg(OH)_2$, NaOH, KOH, and others. In some embodiments, the organic phase containing dissolved lignin is combined with lignin stream 305 of Extraction 2 for refining. In some embodiments, calcium fumarate formed in the aqueous stream is converted back to fumaric acid by applying $CO_2$ gas, i.e. at 2-10, 3-8, or 4-5 barg. Calcium carbonate formed in this process may be removed by filtration.

Optionally, $Ca(OH)_2$ is added to the aqueous phase of separation 408 to raise the pH. The $Ca(OH)_2$-treated aqueous phase may be treated with $CO_2$ gas, i.e. at 2-10, 3-8, or 4-5 barg, to convert any calcium salts of the acid to the acid and calcium carbonate. In some embodiments, calcium carbonate is precipitated and removed by filtration.

In some embodiments, the limited-solubility acid is recovered by precipitation. Preferably, at least 50%, 60%, 70%, 80%, 85%, 90%, 95%, 98% or 99% of the limited-solubility acid is recovered and optionally recycled, such as at least 80%, more preferably at least 95% of the limited-solubility acid is recovered and optionally recycled.

In some embodiments, the limited-solubility acid is recycled in the process by stripping the aqueous phase from dissolved solvent and cooling the remaining aqueous fraction to cause precipitation of the limited-solubility acid. In some embodiments, the precipitated acid is collected by filtration and is re-dissolved in solvent-saturated water for recycling. In a preferred embodiment of this invention, the limited-solubility solvent is 2-butanone (methylethyl ketone, MEK) and the limited-solubility acid is fumaric acid. Starr & King (*Ind. Eng. Chem. Res.* 1992, 31, 2572-2579) teach that the solubility of fumaric acid is greater in saturated solutions of ketones in water as compared to the solubility of fumaric acid in either pure water or dry ketone. While Starr & King did not test the combination of water and MEK, similar behavior is observed for this ternary mixture. As suggested by Starr & King, the recovery of fumaric acid is enhanced by stripping the solvent (MEK) from a solvent-saturated aqueous solution of the acid to cause its effective precipitation. Thus, precipitation and recovery of fumaric acid is enhanced by the removal or reduction of the solvent at a reduced energy cost as is required for the recovery of alternative acids commonly used in the art. In some embodiments, the concentration of the limited-solubility acid in the aqueous stream after acid recovery 450 is less than about 3, 2, 1, 0.9, 0.8, 0.7, 0.6, 0.5, 0.4, 0.3, 0.2, 0.1, 0.05, or 0.01% wt/wt. In some embodiments, at least about 80%, 85%, 90%, 95%, 96%, 97%, 98%, or 99% of the limited-solubility acid is recovered and recycled. In some embodiments, the glucose solution is optionally further concentrated by evaporation of water by any technique known to one skilled in the art to reduce further the total amount of organic acid loss. In some embodiments, the energy consumption of acid recovery 450 is reduced by at least 50%, 60%, 70%, 80%, or 90% compared to the recovery by distillation of organic acids that are soluble in water or water/MEK, including, for example, acetic acid and formic acid.

Figure 3B:
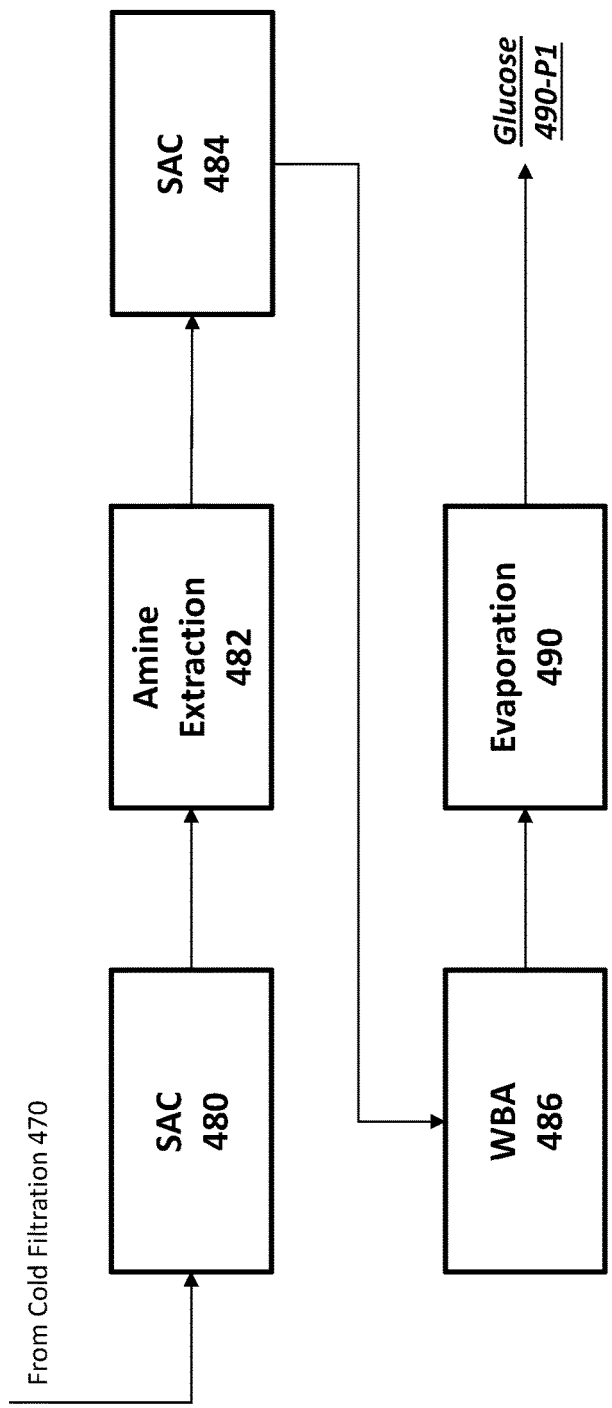
FIG. 3B shows a scheme for refining a glucose hydrolysate.

The refining process of crude glucose is presented in FIG. 3B. This refining process follows the logic disclosed in PCT/US2013/039585 and U.S. Provisional Patent Application No. 62/100,791, incorporated herein by reference. Optionally, the crude product of Extraction 1 (stream 205), comprising hemicellulosic sugars, mineral acid and other impurities, is combined with the cellulosic sugar hydrolysate and refined together. In some embodiments, the crude sugar stream is first contacted with SAC resin 480 to convert all organic anions to their acid form. Remaining organic acids, mineral acids, acid soluble lignin and sugar degradation products, i.e. HMF, furfural and their derivatives, may be extracted in amine extraction 482. In some embodiments, the crude glucose stream is extracted with an amine extractant counter-currently, e.g., the sugar stream flows in an opposite direction to the flow of the amine extractant. The counter-current extraction may be carried out in any suitable device, e.g., a mixer-settler device, stirred tanks, columns, a liquid-liquid separation centrifuge, or any other equipment suitable for this mode of extraction. Preferably, the amine extraction is conducted in a mixer-settler designed to minimize emulsion formation and reduce phase separation time. A mixer-settler has a first stage that mixes the phases together followed by a quiescent settling stage that allows the phases to separate by gravity. Various mixer-settlers known in the art can be used. In some methods, phase separation may be enhanced by incorporating a suitable centrifuge with the mixer-settler or simply using a suitable centrifuge configuration. Preferably, the amine extraction and washing steps are conducted in liquid-liquid separation centrifuges.

The amine extractant may contain 10-90% or preferably 20-60% weight/weight of one or a plurality of amines having at least 20 carbon atoms. Such amine(s) can be primary, secondary, and tertiary amines. Examples of tertiary amines include tri-laurylamine (TLA; e.g. COGNIS ALAMINE 304 from Cognis Corporation; Tucson Ariz.; USA), tri-octylamine, tri-isooctylamine, tri-caprylylamine and tri-decylamine.

Diluents suitable for use in the amine extraction include an alcohol, such as butanol, isobutanol, hexanol, octanol, decanol, dodecanol, tetradecanol, pentadecanol, hexadecanol, octadecanol, eicosanol, docosanol, tetracosanol, or triacontanol. Preferably, the diluent is a long chain alcohol (e.g. C6, C8, C10, C12, C14, or C16 alcohol), or kerosene. The diluent can have additional components. More preferably, the diluent comprises n-hexanol or 2-ethyl-hexanol. Optionally, the diluent comprises hexanol. Most preferably, the diluent comprises 2-ethyl-hexanol. In some embodiments, the diluent consists essentially of, or consists of, 2-ethyl-hexanol.

Optionally, the amine is tri-laurylamine and the diluent is hexanol. The ratio of amine and diluent can be any ratio, e.g., between 3:7 and 6:4 weight/weight. In some methods, the amine extraction solution contains tri-laurylamine and hexanol in a ratio of 1:7, 2:7, 3:7, 6:4, 5.5:4.5, 4:7, 5:7, 6:7, 7:7, 5:4, 3:4, 2:4, or 1:4 weight/weight. Preferably, the amine extraction solution contains tri-laurylamine and hexanol in a ratio of 3:7 weight/weight.

Preferably, the amine is tri-laurylamine and the diluent is 2-ethyl-hexanol. The ratio of amine and 2-ethyl-hexanol can be any ratio, e.g., between 3:7 and 6:4 weight/weight. In some methods, the amine extraction solution contains tri-laurylamine and 2-ethyl-hexanol in a ratio of 1:7, 2:7, 3:7, 6:4, 5.5:4.5, 4:7, 5:7, 6:7, 7:7, 5:4, 3:4, 2:4, or 1:4 weight/weight. Preferably, the amine extraction solution contains tri-laurylamine and 2-ethyl-hexanol in a ratio of 3:7 weight/weight.

The amine extraction can be conducted at any temperature at which the amine is soluble, preferably at 50-70° C. Optionally, more than one extraction step (e.g., 2, 3, or 4 steps) can be used. The ratio of the amine extractant stream (organic phase) to the hemicellulose sugar stream (aqueous phase) can be 0.5-5:1, 1-2.5:1, or preferably, 1.5-3.0:1 weight/weight.

In some embodiments, the acid-depleted sugar stream can be further purified (see, e.g., FIG. 3B). For example, the diluent in the acid-depleted sugar stream can be removed using a packed distillation column. The distillation may remove at least 70%, 80%, 90%, or 95% of the diluent in the acid-depleted sugar stream. With or without a diluent distillation step, the acid-depleted sugar stream may also be contacted with SAC exchanger 484 to remove any residual metallic cations and any residual amines. Preferably, the acid-depleted sugar stream is purified using a packed distillation column followed by a strong acid cation exchanger.

Preferably, the acid-depleted sugar stream may then be contacted with a weak base anion (WBA) exchanger 486 to remove excess protons. The amine-removed and neutralized sugar stream may be pH adjusted and evaporated 490 to 25-65% and preferably 30-40% weight/weight dissolved sugars in any conventional evaporator, e.g., a multiple effect evaporator or a mechanical vapor recompression (MVR) evaporator.

The product of the refining process is optionally pure glucose solution 490-P1, which may be concentrated by one of several known evaporation techniques to the appropriate level. This pure glucose solution is highly suitable as feed for fermentation processes or catalytic conversion processes. For example, this product may be the feed for numerous fermentation processes applied in the industry, which currently employ dextrose made from corn, sugar cane or sugar beet. Some examples of such fermentation processes are disclosed in PCT/IL2012/050118, filed on Apr. 2, 2012, incorporated by reference herein. This glucose product may be the feed to a conversion process to HMF, as disclosed in U.S. Provisional Patent Application No. 62/091,319, filed on Dec. 12, 2014, incorporated by reference herein. In another alternative, the product is a combined sugar solution of high purity, comprising glucose, mannose, galactose, xylose and arabinose, with the ratios of different carbohydrates dependent on the biomass feedstock.

When hemicellulosic sugars are not combined into the stream, the highly purified glucose product may be characterized by one or more, two or more, three or more, four or more, five or more, or six or more characteristics, including: (i) monosaccharides in a ratio to total dissolved sugars >0.50 weight/weight; (ii) glucose in a ratio to total monosaccharides >0.90 weight/weight; (iii) xylose in a ratio to total monosaccharides <0.10 weight/weight; (iv) fructose in a ratio to total monosaccharides <0.10 weight/weight; (v) fructose in a ratio to total monosaccharides >0.01 weight/weight; (vi) furfurals in amounts up to 0.01% weight/weight; (vii) phenols in amounts up to 500 ppm; (viii) hexanol in amounts up to 500 ppm; (ix) $C_4$ carboxylic acid in a ratio to total saccharides <0.05 weight/weight; and (x) fumaric acid in a ratio to total saccharides <0.05 weight/weight. For example, the glucose product may be a mixture having a high monosaccharides to total dissolved sugars ratio, a high glucose content, and a low xylose content. In some embodiments, the sugar mixture is a mixture having a high monosaccharides to total dissolved sugars ratio, a high glucose content, a low xylose content, and a low impurity content (e.g., low furfurals and phenols). In some embodiments, the mixture is characterized by a high monosaccharides to total dissolved sugars ratio, a high glucose content, a low xylose content, a low impurity content (e.g., low furfurals and phenols), and a trace amount of hexanol. In some embodiments, the glucose product is provided as an aqueous solution. The aqueous solution may comprise at least 1%, 5%, 10%, 15%, 20%, 25%, or at least 30% total sugars weight/weight relative to the total weight of the composition.

In certain embodiments, the product of the cellulose pulp extraction process is a sugar composition comprising: (i) monosaccharides in a ratio to total dissolved sugars >0.50 weight/weight; (ii) glucose in a ratio to total monosaccharides >0.80, such as >0.90, weight/weight; (iii) xylose in a ratio to total monosaccharides <0.10 weight/weight; (iv) fructose in a ratio to total monosaccharides <0.10 weight/weight; (v) furfurals in amounts up to 0.01% weight/weight; (vi) phenols in amounts up to 500 ppm; and optionally (vii) hexanol or 2-ethyl-1-hexanol in amounts up to 500 ppm. Optionally, the composition comprises glucose in a ratio to total monosaccharides of 0.80 to 0.99, such as 0.90 to 0.99, weight/weight. Optionally, the composition comprises fructose in a ratio to total monosaccharides of at least 0.0001, 0.001, 0.01, 0.05, 0.08, or 0.09 weight/weight, such as at least 0.01 weight/weight. Optionally, the composition comprises xylose in a ratio to total monosaccharides of at least 0.0001, 0.001, 0.01, 0.05, 0.08, or 0.09 weight/weight, such as at least 0.01 weight/weight. Optionally, the composition further comprises at least 1, 5, 10, 50, 100, 250, 500, 1000, 5000, or 10,000 ppb fumaric acid, such as at least 10 ppb fumaric acid. Optionally, the composition further comprises at least 1, 5, 10, 50, 100, 250, 500, 1000, 5000, or 10,000 ppb furfural, such as at least 10 ppb furfural. Optionally, the composition further comprises at least 1, 5, 10, 50, 100, 250, 500, 1000, 5000, or 10,000 ppb phenols, such as at least 10 ppb phenols. Optionally, the composition further comprises at least 1, 5, 10, 50, 100, 250, 500, 1000, 5000, or 10,000 ppb hexanol or 2-ethyl-1-hexanol, such as at least 10 ppb hexanol or 2-ethyl-1-hexanol. Optionally, the composition further comprises at least 1, 5, 10, 50, 100, 250, 500, 1000, 5000, or 10,000 ppb methylethyl ketone, such as at least 10 ppb methylethyl ketone. Optionally, the composition further comprises C6 oligosaccharides in a ratio to total dissolved sugars of 0.001 to 0.30, 0.001 to 0.20, 0.01 to 0.20, 0.001 to 0.10, 0.01 to 0.10, 0.001 to 0.05, or 0.01 to 0.05 weight/weight, such as 0.01 to 0.10 weight/weight. In some embodiments, the sugar composition is provided as an aqueous solution. The aqueous solution may comprise at least 1%, 5%, 10%, 15%, 20%, 25%, or at least 30% total sugars weight/weight relative to the total weight of the composition.

When hemicellulosic sugars are combined, the highly purified cellulosic sugar product may be characterized by one or more, two or more, three or more, four or more, five or more, or six or more characteristics, including (i) monosaccharides in a ratio to total dissolved sugars >0.50 weight/weight; (ii) glucose in a ratio to total monosaccharides >0.50 weight/weight; (iii) glucose in a ratio to total monosaccharides >0.80 weight/weight; (iv) fructose in a ratio to total monosaccharides <0.10 weight/weight; (v) fructose in a ratio to total monosaccharides >0.01 weight/weight; (vi) xylose in a ratio to total monosaccharides <0.10 weight/weight; (vii) furfurals in amounts up to 0.01% weight/weight; (viii) phenols in amounts up to 500 ppm; (ix) hexanol in amounts up to 500 ppm; (x) $C_4$ carboxylic acid in a ratio to total saccharides <0.05 weight/weight; and (xi) fumaric acid in a ratio to total saccharides <0.05 weight/weight. For example, the sugar mixture may be a mixture having a high monosaccharides to total dissolved sugars ratio, a high glucose content, and a low xylose content. In some embodiments, the sugar mixture is a mixture having a high monosaccharides to total dissolved sugars ratio, a high glucose content, a low xylose content, and a low impurity content (e.g., low furfurals and phenols). In some embodiments, the mixture is characterized by a high monosaccharides to total dissolved sugars ratio, a high glucose content, a low xylose content, a low impurity content (e.g., low furfurals and phenols), and a trace amount of hexanol. In some embodiments, the sugar product is provided as an aqueous solution. The aqueous solution may comprise at least 1%, 5%, 10%, 15%, 20%, 25%, or at least 30% total sugars weight/weight relative to the total weight of the composition.

EXAMPLES

It is understood that the examples and embodiments described herein are for illustrative purposes only and are not intended to limit the scope of the claimed invention. It is also understood that various modifications or changes in light of the examples and embodiments described herein will be suggested to persons skilled in the art and are to be included within the spirit and purview of this application and scope of the appended claims. All publications, patents, and patent applications cited herein are hereby incorporated by reference in their entirety for all purposes.

Example 1—Extraction and Refining of Bagasse

Bagasse sugar composition (DB4D01): Bagasse was shredded in a wood shredder. In a temperature controlled tank, bagasse (60 lbs, dry base) was then treated with an aqueous solution containing 0.5% $H_2SO_4$ (wt/wt) at a liquid to solid ratio of 14:2. The average temperature of the temperature controlled tank was maintained at 130-135° C. for 3 hours. The solution was circulated by pumping. The resulting liquor was collected and the solids washed with water. The wash water was then used to prepare the acid solution for the next batch by adding acids as needed. The hemicellulose-depleted lignocellulosic matter was collected and dried.

The acidic hemicellulose sugar stream was run through a SAC column. The sugar stream was then extracted continuously in a series of mixer settlers (2 countercurrent stages) with an extractant having tri-laurylamine:hexanol at a ratio of 30:70. The extractant to sugar stream ratio was kept in the range of 2:1 to 1.5:1. The resulting aqueous phase was further purified by using a SAC resin, a WBA resin, and a mixed bed resin. The pH of the resulting stream was adjusted to 4.5 with 0.5% HCl and the sugar solution evaporated to a concentration of ~30% dissolved solids (DS). The resulting sugar stream contained about 7% arabinose, 2.5% galactose, 6.5% glucose, 65% xylose, 1.5% mannose, 4% fructose and 14% oligosaccharides (all % weight/total sugars). This sugar solution was further processed by fractionation on an SSMB system, resulting in a xylose rich fraction and a xylose depleted fraction. Each fraction was concentrated by evaporation. Table 1 provides a chemical analysis of the resulting xylose rich sugar solution.

TABLE 1

Chemical analysis of a hemicellulose sugar mixture produced by hemicellulose sugar extraction and purification of bagasse

| PARAMETER | RESULT | UNITS |
| --- | --- | --- |
| Appearance | Colorless | |
| pH | 3.58 | |
| Saccharides | | |
| % TS (HPLC) | 68.2 | % w/w |
| Composition (HPAE-PAD) | | |
| XYLOSE | 81.84 (55.81) | %/TS (% w/w) |
| ARABINOSE | 4.38 (2.99) | %/TS (% w/w) |
| MANNOSE | 1.99 (1.36) | %/TS (% w/w) |
| GLUCOSE | 5.07 (3.46) | %/TS (% w/w) |
| GALACTOSE | 0.91 (0.62) | %/TS (% w/w) |
| FRUCTOSE | 6.15 (4.20) | %/TS (% w/w) |
| Impurities | | |
| Furfurals (GC) | <0.005 | % w/w |
| Phenols (FC) | 0.04 | % w/w |
| Metals & inorganics (ICP) | | |
| Ca | <2 | ppm |
| Cu | <2 | ppm |
| Fe | <2 | ppm |
| K | <2 | ppm |
| Mg | <2 | ppm |
| Mn | <2 | ppm |
| Na | <2 | ppm |
| S | <10 | ppm |
| P | <10 | ppm |

Example 2—Refined Bagasse Sugar Stream

Bagasse was extracted and refined according to Example 1. The process was conducted at pilot scale at Virdia PDU, Danville Va. Table 2 summarizes the sugar profile of the refined sugar stream.

TABLE 2

Sugar composition of a hemicellulose sugar mixture produced
by hemicellulose sugar extraction and purification of bagasse

| | Weight (g) | | | | | | | | | | |
|---|---|---|---|---|---|---|---|---|---|---|---|
| Ref. | 418 | 416 | 420 | 422 | 423 | 424 | 502 | 507 | 508 | 517 | Avg |
| Total Sugars | 87.53 | 87.53 | 86.68 | 89.79 | 76.02 | 87.81 | 76.25 | 71.41 | 81.11 | 88.41 | 83.25 |
| Arabinose | 5.59 | 5.59 | 6.13 | 5.90 | 4.81 | 5.59 | 3.63 | 3.14 | 3.60 | 4.06 | 4.80 |
| Galactose | 2.05 | 2.05 | 2.12 | 2.03 | 1.62 | 2.02 | 1.84 | 1.74 | 1.78 | 1.95 | 1.92 |
| Glucose | 5.09 | 5.09 | 5.58 | 5.33 | 4.65 | 6.79 | 7.15 | 6.75 | 7.54 | 6.79 | 6.07 |
| Xylose | 58.69 | 58.69 | 56.58 | 59.05 | 52.14 | 58.11 | 50.65 | 47.21 | 56.24 | 55.10 | 55.25 |
| Mannose | 1.51 | 1.51 | 1.12 | 1.43 | 1.30 | 2.27 | 2.22 | 2.09 | 2.27 | 1.84 | 1.75 |
| Fructose | 3.12 | 3.12 | 3.37 | 1.97 | 1.54 | 2.52 | 2.86 | 2.94 | 2.16 | 3.49 | 2.71 |

Example 3—Fractionation of Refined Bagasse Sugar Stream

Refined bagasse produced according to Example 2 was fractionated by chromatography (as per PCT/US2013/039585) to produce a xylose enriched extract stream (Table 3A) and xylose depleted raffinate stream (Table 3B).

TABLE 3A

Sugar composition of a xylose enriched sugar mixture produced from bagasse

| | Weight (g) | | | | | | | | | | |
|---|---|---|---|---|---|---|---|---|---|---|---|
| Ref. | 418 | 416 | 420 | 422 | 423 | 424 | 502 | 507 | 508 | 517 | Avg |
| Total Sugars | 45.01 | 45.01 | 67.60 | 66.06 | 70.42 | 69.72 | 44.97 | 63.04 | 58.11 | 46.74 | 57.67 |
| Arabinose | 0.23 | 0.23 | 3.35 | 4.38 | 3.60 | 3.91 | 1.06 | 2.16 | 1.60 | 0.96 | 2.15 |
| Galactose | 0.04 | 0.04 | 0.58 | 0.96 | 0.69 | 0.73 | 0.25 | 0.76 | 0.48 | 0.20 | 0.47 |
| Glucose | 0.37 | 0.37 | 3.31 | 4.52 | 3.57 | 4.16 | 1.85 | 4.08 | 3.20 | 1.36 | 2.68 |
| Xylose | 39.09 | 39.09 | 57.86 | 53.33 | 60.13 | 55.34 | 38.27 | 51.98 | 50.18 | 39.89 | 48.51 |
| Mannose | 0.23 | 0.23 | 0.69 | 1.32 | 0.84 | 1.91 | 0.80 | 1.64 | 1.40 | 0.88 | 1.00 |
| Fructose | 0.68 | 0.68 | 1.78 | 1.55 | 1.58 | 3.67 | 2.75 | 2.40 | 1.20 | 3.40 | 1.97 |

TABLE 3B

Sugar composition of a xylose depleted sugar mixture produced from bagasse

| | Weight (g) | | | | | | | | | | |
|---|---|---|---|---|---|---|---|---|---|---|---|
| Ref. | 418 | 416 | 420 | 422 | 423 | 424 | 502 | 507 | 508 | 517 | Avg |
| Total Sugars | 18.00 | 18.00 | 19.15 | 18.00 | 10.24 | 17.62 | 15.32 | 12.68 | 19.53 | 22.98 | 17.15 |
| Arabinose | 2.32 | 2.32 | 2.42 | 1.63 | 1.14 | 1.84 | 1.21 | 1.24 | 2.07 | 2.11 | 1.83 |
| Galactose | 1.36 | 1.36 | 1.32 | 1.00 | 0.63 | 1.12 | 1.07 | 0.94 | 1.53 | 1.49 | 1.18 |
| Glucose | 1.88 | 1.88 | 2.02 | 1.27 | 0.89 | 1.53 | 2.54 | 2.64 | 4.79 | 3.75 | 2.32 |
| Xylose | 2.87 | 2.87 | 3.17 | 3.82 | 2.14 | 3.78 | 3.13 | 2.51 | 4.60 | 5.02 | 3.39 |
| Mannose | 0.36 | 0.36 | 0.42 | 0.28 | 0.15 | 0.29 | 0.45 | 0.46 | 0.84 | 0.80 | 0.44 |
| Fructose | 0.57 | 0.57 | 0.65 | 0.51 | 0.20 | 0.19 | 0.72 | 0.46 | 0.57 | 1.07 | 0.55 |

Figure 4:
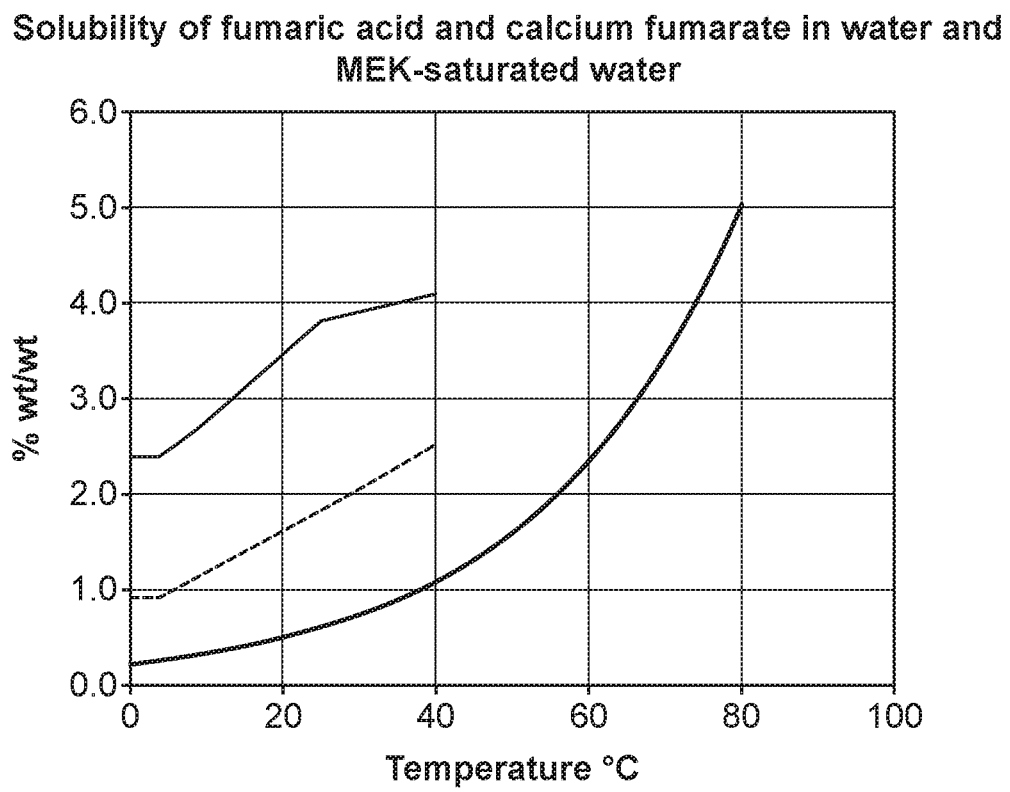
FIG. 4 shows the solubility of fumaric acid and calcium fumarate in pure water and in water saturated with methylethyl ketone.

Example 4—Evaluating Solubility of Fumaric Acid and Calcium Fumarate in Water-MEK Mixtures Water and methylethyl ketone (MEK) were shaken for several minutes to allow saturation of each phase. The phases were separated. An excess amount of fumaric acid was stirred at 40° C. in each phase for 5 hours in a closed container. A sample of the solution was diluted with water and filtered. The concentration of fumaric acid was determined by HPLC by injecting 1-20 µL onto a Bio-Rad Aminex HPX-87H 7.2 mm column, using 0.003 M $H_2SO_4$ as eluent, flow rate 0.6 mL/min, temperature 65° C., and an RI detector. The saturated solution was held in a thermostated bath at 25° C., 10° C., 4° C. and 0° C. and allowed to equilibrate at each temperature. A sample of each solution was taken, diluted with water and injected onto the HPLC to determine fumaric acid concentration. Similarly, excess amounts of fumaric acid and $Ca(OH)_2$ were shaken with each phase and the concentration of fumaric acid determined by HPLC in a diluted, filtered sample. The solubility curves of fumaric acid and calcium fumarate are shown in FIG. 4.

Example 5—Evaluating the Partition Coefficient of Fumaric Acid and Calcium Fumarate in a Two Phase System of Water and MEK An excess amount of fumaric acid was shaken overnight at 4° C. in a biphasic system of water and MEK. The fumaric acid concentration in each phase was determined by HPLC as described in Example 4. Similarly, excess amounts of both fumaric acid and calcium hydroxide were equilibrated with a biphasic system of water and MEK. The partition coefficient was calculated as:

$$K = \frac{\text{Concentration in } MEK, \% \text{ wt}}{\text{Concentration in water, } \% \text{ wt}}$$

K was determined to be 8.6 for fumaric acid and 0.5 for calcium fumarate.

Example 6—Performing Extraction 2 with Water-MEK-Fumaric Acid

Hemicellulose-depleted bagasse (treated as described in the examples above) of DS-47% was contacted for 2 hours with a mixture of water, MEK and fumaric acid using reaction conditions summarized in Table 6. The liquid to solid ration was maintained at 17:1 and the MEK to water ratio was 1:1. The mixture was heated in a Parr 5500 pressure reactor with a 4848 reactor controller. After the reactor was cooled down, the solids were filtered, washed with water saturated MEK, dried, and the solids weighed. The dried cellulosic-remainder was characterized by NREL/TP-510-42618 method to determine the cellulose and lignin content. The amount of ash in the lignin could not be determined at the available quantities, but is estimated to be about 5%, i.e., if the % lignin+ash is reported as 20%, then mixture comprises about 15% lignin and about 5% ash.

TABLE 6

Reaction conditions of Extraction 2

| Temp (° C.) | Fumaric acid (% w/w of liquid) | Time (h) | % lignin + ash (w/w of pulp) |
|---|---|---|---|
| 170 | 0.1 | 2 | 24 |
| 170 | 0.3 | 2 | 22 |
| 190 | 0.1 | 2 | 19 |
| 190 | 0.3 | 3 | 15 |
| 180 | 0.2 | 2 | 20 |

The liquid phase is split into two fractions. Fraction A is separated to obtain the organic phase and the aqueous phase. A sample of the organic phase is evaporated to dryness to determine the amount of dissolved lignin. Fraction B is first titrated with $Ca(OH)_2$ to pH 3.5-3.8 and is then treated similarly to Fraction A.

Example 7—Performing Extraction 3 with Water-MEK-Fumaric Acid

The solid separated in Example 6 having DS of 30-50% wt/wt is introduced into a high pressure lab reactor equipped with a stirrer and thermostated heating system (Autoclave Engineers). Alternatively, a reaction vessel fabricated in the lab from metal piping and Swagelock® fittings allowing for the rapid conduction of heating and cooling is heated by dipping it into a hot oil bath using DowTherm A thermal fluid and cooled by dipping into a water bath. The reaction vessel is loaded with a water/MEK solution at 13:1 ratio to dry solids. The solution comprises MEK:water at about 35:65% wt/wt and fumaric acid as indicated in Table 7, and the reaction is conducted for 10-40 minutes at the reaction temperature.

TABLE 7

Reaction conditions of Extraction 3

| Temp (° C.) | Fumaric acid (% w/w of liquid) |
|---|---|
| 200 | 1.0 |
| 220 | 1.0 |
| 230 | 1.0 |
| 240 | 1.0 |
| 250 | 1.0 |
| 220 | 2.0 |
| 250 | 2.0 |

After the reaction is cooled down, the content of the reactor is tested to determine if all of the solid have been hydrolyzed to liquid, and any remaining solid is filtered, dried and its weight measured. The liquid phase is split into two fractions. Fraction A is separated to obtain the organic phase and the aqueous phase. A sample of the organic phase is evaporated to dryness to determine the amount of dissolved lignin. Fraction B is first titrated with $Ca(OH)_2$ to pH 3.5-3.8 and is then treated similarly to Fraction A. The aqueous phase is analyzed for total sugars, for monomer/oligomer composition and for carbohydrate composition.

Further Embodiments of the Disclosure

1. A process of producing hemicellulosic mixed sugars, lignin and glucose from a biomass, comprising:
   (i) extracting hemicellulose sugars from the biomass, thereby obtaining a hemi-depleted remainder, wherein the hemi-depleted remainder comprises lignin and cellulose;
   (ii) contacting the hemi-depleted remainder with a lignin extraction solution to produce a lignin extract and a cellulosic remainder; wherein the lignin extraction solution comprises a limited-solubility solvent, a limited-solubility organic acid, and water, wherein the limited-solubility solvent and water form an organic phase and an aqueous phase;
   (iii) separating the lignin extract from the cellulosic remainder, wherein the lignin extract comprises lignin dissolved in the limited-solubility solvent and the cellulosic remainder comprises cellulose and residual lignin; and
   (iv) contacting the cellulosic remainder with a cellulose hydrolysis solution to hydrolyze cellulose and extract residual lignin; wherein the cellulose hydrolysis solution comprises the limited-solubility solvent, the limited-solubility organic acid and water, wherein the limited-solubility solvent and water form an organic phase and an aqueous phase.

2. The process of embodiment 1, wherein before contacting the cellulosic remainder with the cellulose hydrolysis solution, the cellulosic remainder is treated with the lignin extraction solution to increase porosity and reduce crystallinity, wherein the treatment comprises contacting the cellulosic remainder with the lignin extraction solution at elevated temperature and pressure and releasing the pressure rapidly to create a solvent explosion effect.

3. The process according to embodiment 1 or 2, wherein the limited-solubility organic acid is recycled by applying one, two, three, or four step(s) selected from:
   (i) contacting the aqueous stream(s) after phase separation with $CO_2$ at a pressure of at least 2 barg to convert calcium fumarate to fumaric acid and calcium carbonate;

(ii) stripping the limited-solubility solvent from the aqueous phase comprising fumaric acid by evaporation to produce a solvent-depleted aqueous phase;
(iii) concentrating the aqueous phase comprising glucose and fumaric acid; and
(iv) cooling the solvent-depleted aqueous phase to less than 5° C. to cause precipitation of fumaric acid and filtering the precipitate to collect the fumaric acid for further use.

4. The process of embodiment 3, wherein loss of the limited-solubility organic acid per kg of glucose produced is less than 25 g.

5. A highly purified glucose product characterized by one or more, two or more, three or more, four or more, five or more, or six or more characteristics selected from:
(i) monosaccharides in a ratio to total dissolved sugars >0.50 weight/weight;
(ii) glucose in a ratio to total monosaccharides >0.90 weight/weight;
(iii) xylose in a ratio to total monosaccharides <0.10 weight/weight;
(iv) fructose in a ratio to total monosaccharides <0.10 weight/weight;
(v) fructose in a ratio to total monosaccharides >0.01 weight/weight;
(vi) furfurals in amounts up to 0.01% weight/weight;
(vii) phenols in amounts up to 500 ppm;
(viii) hexanol in amounts up to 500 ppm;
(ix) $C_4$ carboxylic acid in a ratio to total saccharides <0.05 weight/weight; and
(x) fumaric acid in a ratio to total saccharides <0.05 weight/weight.

6. The use of the highly purified glucose product of embodiment 5 as feed for a fermentation process or chemical conversion process to produce a product.

7. The highly purified glucose product of embodiment 5, comprising fumaric acid in an amount less than 0.05% weight/weight.

8. A process for the hydrolysis of cellulose pulp, comprising:
(i) contacting the cellulose pulp with water, a limited-solubility solvent, and a limited-solubility acid; and
(ii) heating the cellulose pulp to a temperature of about 200-400° C.

9. The process of embodiment 8, wherein the limited-solubility acid is a dicarboxylic acid.

10. The process of embodiment 8 or 9, wherein the limited-solubility acid has at least one pKa value between 1.9 and 3.5 in water.

11. The process of any one of embodiments 8-10, wherein the solubility of the limited-solubility acid in water at 4° C. is less than 1% wt/wt.

12. The process of any one of embodiments 8-11, wherein the limited-solubility acid is fumaric acid.

13. The process of any one of embodiments 8-12, wherein the limited-solubility solvent comprises a 4- to 8-carbon ketone.

14. The process of any one of embodiments 8-13, wherein the limited-solubility solvent is methylethyl ketone.

15. The process of any one of embodiments 8-14, wherein at least a portion of the limited-solubility acid is recovered by precipitation.

16. The process of any one of embodiments 8-15, wherein the cellulose pulp has undergone a pretreatment step.

17. The process of embodiment 16, wherein the pretreatment step comprises:
(i) contacting the cellulose pulp with water, solvent, and a limited-solubility organic acid;
(ii) heating the cellulose pulp to a temperature of about 160-220° C. in a closed system; and
(iii) opening the closed system to rapidly release pressure.

What is claimed is:

1. A process for the hydrolysis of cellulose pulp, comprising:
(i) contacting the cellulose pulp with water, a first limited-solubility solvent, and a first limited-solubility acid, thereby forming a slurry, wherein the first limited-solubility solvent has an aqueous solubility of less than 40% wt/wt at 20° C., wherein the first limited-solubility acid comprises a dicarboxylic acid, and wherein the first limited-solubility acid has an aqueous solubility of less than 1% wt/wt at 4° C.;
(ii) heating the slurry to a temperature of about 200-400° C., thereby forming a treated slurry;
(iii) recovering a cellulosic hydrolysate comprising glucose in a ratio to total monosaccharides greater than 0.80 from the treated slurry; and
(iv) recovering the first limited-solubility dicarboxylic acid by precipitation, wherein at least 80% of the first limited-solubility dicarboxylic acid is recovered.

2. The process of claim 1, wherein the first limited-solubility acid has at least one pKa value between 1.9 and 3.5 in water.

3. The process of claim 1, wherein the first limited-solubility acid is fumaric acid.

4. The process of claim 1, wherein the aqueous solubility of the first limited-solubility solvent at 20° C. is between 10% and less than 40% wt/wt.

5. The process of claim 1, wherein the first limited-solubility solvent comprises a 4- to 8-carbon ketone.

6. The process of claim 1, wherein the first limited-solubility solvent is methylethyl ketone.

7. The process of claim 1, wherein the first limited-solubility solvent is a 4 to 8-carbon ketone having an aqueous solubility of between 10 and less than 40% wt/wt at 20° C., and wherein the first limited-solubility acid is a dicarboxylic acid having an aqueous solubility of less than 1% wt/wt at 4° C.

8. The process of claim 1, further comprising pretreating the cellulose pulp prior to the contacting of (i), wherein the pretreating comprises:
(a) contacting the cellulose pulp with water, a second limited-solubility solvent, and a second limited-solubility acid, thereby forming a pretreatment slurry;
(b) heating the pretreatment slurry to a temperature of 160-220° C. in a closed system; and
(c) opening the closed system to rapidly release pressure.

9. The process of claim 1, wherein the cellulose pulp comprises:
(i) cellulose;
(ii) hemicellulose in an amount up to 5% weight/weight relative to total solids;
(iii) ash in an amount up to 6% weight/weight relative to total solids; and
(iv) sulfate in an amount up to 3% weight/weight relative to total solids.

10. The process of claim 9, wherein the cellulose pulp further comprises lignin.

11. The process of claim 9, wherein the cellulose pulp comprises less than 5% water soluble carbohydrates at 20° C.

12. The process of claim 1, comprising at least 10 kg of the cellulose pulp.

13. The process of claim 1, wherein the recovering the cellulosic hydrolysate comprises phase separation of an aqueous phase comprising the cellulosic hydrolysate from an organic phase comprising the first limited-solubility solvent.

14. The process of claim 1, further comprising, prior to the contacting step:
   (a) extracting hemicellulose sugars from a lignocellulosic biomass, thereby obtaining a hemi-depleted remainder, the hemi-depleted remainder comprising lignin and cellulose;
   (b) treating the hemi-depleted remainder with a third limited-solubility solvent, a third limited-solubility acid, and water, wherein the third limited-solubility solvent and the water form an organic phase and an aqueous phase; and
   (c) separating the organic phase from the aqueous phase, wherein the aqueous phase comprises the cellulose pulp.

15. The process of claim 14, wherein the separating comprises contacting the aqueous phase with $CO_2$ at a pressure of at least 2 barg to produce a carbonated aqueous phase.

\* \* \* \* \*